United States Patent
Lee et al.

(10) Patent No.: US 8,551,358 B2
(45) Date of Patent: Oct. 8, 2013

(54) LIQUID-CRYSTALLINE MEDIUM

(75) Inventors: Seung-Eun Lee, Seoul (KR); Eun Young Kim, Gunpo (KR); Dong-Mee Song, Hwasung (KR); Kyung-Ah Park, Suwon (KR); Sang-Hyun Park, Pyongtaek (KR); Eun-Kyu Lee, Daejeon (KR)

(73) Assignee: Merck Patent GmbH, Darmstadt (DE)

( * ) Notice: Subject to any disclaimer, the term of this patent is extended or adjusted under 35 U.S.C. 154(b) by 47 days.

(21) Appl. No.: 13/000,747

(22) PCT Filed: Jun. 23, 2009

(86) PCT No.: PCT/EP2009/004510
§ 371 (c)(1),
(2), (4) Date: Dec. 22, 2010

(87) PCT Pub. No.: WO2009/156118
PCT Pub. Date: Dec. 30, 2009

(65) Prior Publication Data
US 2011/0095229 A1    Apr. 28, 2011

(30) Foreign Application Priority Data
Jun. 27, 2008 (EP) ..................................... 08011673

(51) Int. Cl.
*C09K 19/00* (2006.01)
*C09K 19/06* (2006.01)
*C09K 19/34* (2006.01)
*C09K 19/52* (2006.01)

(52) U.S. Cl.
USPC ............ 252/299.6; 252/299.01; 252/299.61; 252/299.62; 252/299.64; 252/299.66; 428/1.1; 428/1.3; 349/1; 349/56; 349/167; 349/182

(58) Field of Classification Search
USPC ............... 252/299.01, 299.6, 299.61, 299.62, 252/299.64, 299.66; 428/1.1, 1.3; 349/1, 349/56, 167, 182
See application file for complete search history.

(56) References Cited

U.S. PATENT DOCUMENTS

| 7,731,865 | B2 * | 6/2010 | Bernatz et al. | 252/299.01 |
| 7,807,068 | B2 * | 10/2010 | Bremer et al. | 428/1.1 |
| 2007/0228329 | A1 | 10/2007 | Yanai et al. | |
| 2008/0083903 | A1 | 4/2008 | Saito et al. | |
| 2008/0128653 | A1 | 6/2008 | Manabe et al. | |
| 2009/0141215 | A1 | 6/2009 | Bremer et al. | |
| 2011/0261311 | A1 * | 10/2011 | Jansen et al. | 349/182 |
| 2012/0162595 | A1 * | 6/2012 | Lee et al. | 349/183 |

FOREIGN PATENT DOCUMENTS

| DE | 10 2005 027762 A1 | 1/2006 |
| EP | 2 065 316 A | 2/2007 |
| EP | 1 908 814 A | 4/2008 |
| EP | 1 970 362 A | 9/2008 |
| WO | WO 2005/123879 A | 12/2005 |
| WO | WO 2007/077844 A | 7/2007 |
| WO | WO 2008/061606 A | 5/2008 |

OTHER PUBLICATIONS

International Search Report of PCT/EP2009/004510, Date of Completion Sep. 23, 2009. Date of Mailing Sep. 29, 2010.

\* cited by examiner

*Primary Examiner* — Geraldina Visconti
(74) *Attorney, Agent, or Firm* — Millen, White, Zelano & Branigan, P.C.

(57) ABSTRACT

The present invention relates to a liquid-crystalline medium, characterised in that it contains
  a polymerisable component (A) containing one more polymerisable compounds
and
  a liquid-crystalline component (B) containing one more compounds of the general formula I

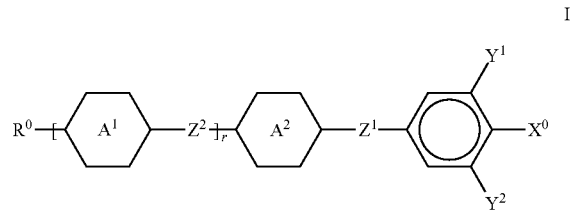

in which
R, rings $A^1$ and $A^2$, $Z^1$, $Z^2$, $Y^1$, $Y^2$, $X^0$ and r are as defined in Claim 1.

20 Claims, No Drawings

LIQUID-CRYSTALLINE MEDIUM

The present invention relates to a liquid-crystalline medium containing at least one polymerisable compound, to the use thereof for electro-optical purposes, and to display devices containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are TN cells having a twisted nematic structure, STN ("supertwisted nematic") cells, ECB ("electrically controlled birefringence") cells and IPS ("in-plane switching") cells.

The commonest display devices are based on the Schadt-Helfrich effect and have a twisted nematic structure, such as, for example, in TN and STN cells. They can be operated as multiplex or as active-matrix displays (AMD-TN, AMD=active matrix driven).

In the case of TN displays, liquid-crystal media are desired which enable the following advantages in the cells: an extended nematic phase range (in particular down to low temperatures), switchability at extremely low temperatures (outdoor use, automobiles, avionics) and increased resistance to UV radiation (longer service life). With the media available from the prior art, however, it is not possible to achieve these advantages while simultaneously retaining the other parameters.

In the case of the more highly twisted STN displays, liquid-crystal media are desired which enable greater multiplexability and/or lower threshold voltages and/or broader nematic phase ranges (in particular at low temperatures). To this end, a further extension of the available parameter latitude (clearing point, smectic-nematic transition or melting point, viscosity, dielectric parameters, elastic parameters) is urgently desired.

Besides the known liquid-crystal displays (TN, STN, ECB and IPS), in which the electric fields for realignment are generated essentially perpendicular to the liquid-crystal layer, displays also exist in which the electric signals are generated in such a way that the electric fields have a significant component parallel to the liquid-crystal layer. A display of this type, known as an IPS ("in-plane switching") display, is disclosed, for example, in WO 91/10936.

The TN displays containing the known liquid-crystalline media are characterised by inadequately long response times and often by excessively high operating voltages. There is thus a demand for liquid-crystal media for TN displays which do not have these disadvantages or only do so to a reduced extent. To this end, there is a particular requirement for liquid-crystalline materials which, besides an adequate phase range, a low tendency toward crystallisation at low temperatures, low birefringence and adequate electrical resistance, have, in particular, low threshold voltages ($V_{10}$) and small response times.

TN displays can e.g. be operated as matrix displays.

Matrix liquid-crystal displays are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used, is the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells (TN-TFT) with crossed polarisers in transmission and are back-lit.

The term MLC displays here covers any matrix display having integrated non-linear elements, i.e., besides the active matrix, also displays with passive elements, such as varistors or diodes (MIM=metal-insulator-metal).

For matrix liquid-crystal displays having integrated non-linear elements for switching individual pixels (MLC displays), media having large positive dielectric anisotropy, broad nematic phases, relatively low birefringence, very high specific resistance, good UV and temperature stability and low vapour pressure, for example, are desired.

MLC displays of this type are particularly suitable for TV applications (for example pocket TVs) and for high-information displays for computer applications (laptops) and in automobile and aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance has the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The known MLC displays do not meet these requirements.

There thus continues to be a great demand for MLC displays having very high specific resistance at the same time as a large working-temperature range, short response times even at low temperatures and low threshold voltage which do not have the disadvantages mentioned, or only do so to a reduced extent.

Besides liquid-crystal displays which use backlighting, i.e. are operated transmissively and optionally transflectively, there is also particular interest in reflective liquid-crystal displays. These reflective liquid-crystal displays use the ambient light for information display. They thus consume significantly less energy than back-lit liquid-crystal displays of corresponding size and resolution. Since the TN effect is characterised by very good contrast, reflective displays of this type are easy to read even under bright ambient conditions.

This is already known of simple reflective TN displays, as used, for example, in wristwatches and pocket calculators. However, the principle can also be applied to high-quality, higher-resolution active matrix-addressed displays, such as, for example, TFT displays. Here, as is already the case in the generally conventional transmissive TFT-TN displays, the use of liquid crystals of low birefringence ($\Delta n$) is necessary in order to achieve low optical retardation ($d \cdot \Delta n$). This low optical retardation results in a low viewing-angle dependence of the contrast, which is usually acceptable (cf. DE 30 22 818). In reflective displays, the use of liquid crystals of low birefringence is even more important than in transmissive displays, since in reflective displays, the effective layer thickness through which the light passes is approximately twice as great as in transmissive displays of the same layer thickness.

The advantages of reflective displays over transmissive displays, besides the lower power consumption (since backlighting is unnecessary), are the space saving, which results in a very small physical depth, and the reduction in problems due to temperature gradients caused by different degrees of heating by the backlighting.

In general, liquid-crystal materials for the above-mentioned display types must have good chemical and thermal stability and good stability towards electric fields and electromagnetic radiation. Furthermore, the liquid-crystal materials should have low viscosity and give short addressing times, low threshold voltages and high contrast in the cells.

Furthermore, they should have a suitable mesophase, for example a nematic or cholesteric mesophase for the above-mentioned cells, at usual operating temperatures, i.e. in the broadest possible range below and above room temperature. Since liquid crystals are generally used in the form of mixtures of a plurality of components, it is important that the components are readily miscible with one another. Other properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

In TN (Schadt-Helfrich) cells, media are desired which facilitate the following advantages in the cells:
  extended nematic phase range (in particular down to low temperatures)
  the ability to switch at extremely low temperatures (outdoor use, automobiles, avionics)
  increased resistance to UV radiation (longer service life)
  low threshold (driving) voltage
  fast response times
  sufficiently high birefringence
  sufficiently high resistivity to provide a sufficiently high Voltage Holding Ratio (HR)
  a sufficiently high pretilt in cells and displays, in particular to avoid defects in orientation.

The media available from the prior art do not allow these advantages to be achieved while simultaneously retaining the other parameters.

The present invention thus has the object of providing media for MLC, TN, FFS or IPS displays of this type, in particular for TN-TFT displays, which do not have the above-mentioned disadvantages, or only do so to a reduced extent, and preferably have a low threshold voltage, low rotational viscosity, fast response times and at the same time high specific resistance values, high thermal stability, high UV stability and in particular high values of the voltage holding ratio (VHR) on UV exposure and heating.

It has now been found that a small amount of a polymerisable compound added to a specific LC medium having a positive dielectrically anisotropy, applied into the LC cell and after polymerisation in situ, improves the response times and the electro-optical properties.

By addition of small amounts of one or more polymerisable compounds, also known as "reactive mesogens" (RMs), to the LC mixture for the TN mode LC media are obtained which show improved properties compared to LC mixtures without any RMs.

Displays containing the mixtures according to the present invention enable the setting of a pretilt angle and preferably at the same time have very high specific resistance values, low threshold voltages and short response times.

The present invention relates to a liquid-crystalline medium, characterised in that it contains
  a polymerisable component (A) containing one more polymerisable compounds
and
  a liquid-crystalline component (B) containing one more compounds of the general formula I

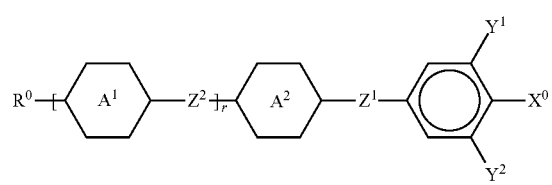

in which
$R^0$ is an alkyl or alkenyl radical having from 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

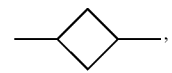

—CO—, —CO—O—, —O—CO—, —O—CO—O—, —CH=CH— or —C≡C— in such a way that O atoms are not linked directly to one another,

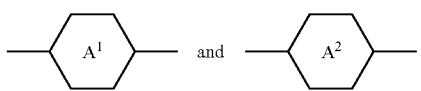

are each independently

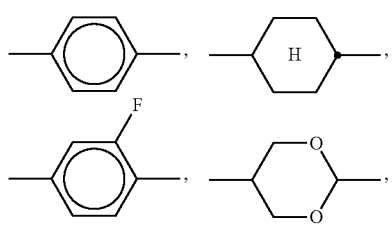

-continued

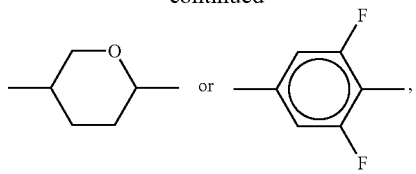

$Y^1$ and $Y^2$ are each, independently of one another, H or F, $Z^1$ is —CF$_2$O—, —OCF$_2$— or —COO—, preferably —CF$_2$O—

$Z^2$ is —O—, —S—, —CO—, —COO—, —COO—, —S—CO—, —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C— or a single bond, preferably a single bond, $X^0$ is F, Cl, halogenated alkyl, halogenated alkenyl, halogenated alkoxy or halogenated alkenyloxy having up to 6 carbon atoms, preferably F or OCF$_3$, and r is 0, 1, 2 or 3.

The invention furthermore relates to the use of a medium according to the invention for electro-optical purposes.

The invention furthermore relates to an electro-optical liquid-crystal display containing a liquid-crystalline medium according to the invention.

The invention furthermore relates also to an electro-optical liquid-crystal display containing a liquid-crystalline medium according to the invention which is characterised in that it is a TN, STN or TN-TFT display.

Suitable polymerisable compounds, also called "reactive mesogens (RMs)", of the component (A) are known from the prior art. Many of these compounds are commercially available.

Preferred polymerisable compounds (monomers), for example, are selected from the formulae I*1 to I*20,

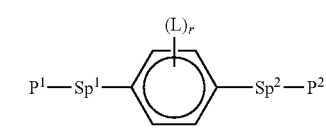

I*1

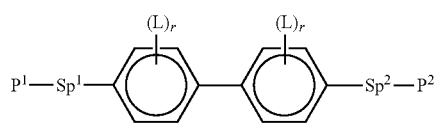

I*2

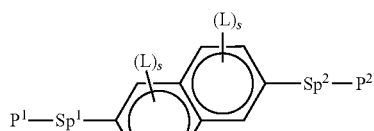

I*3

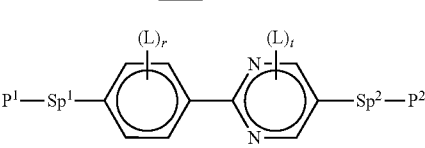

I*4

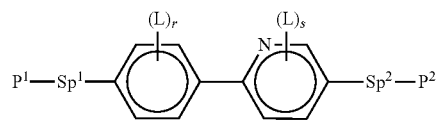

I*5

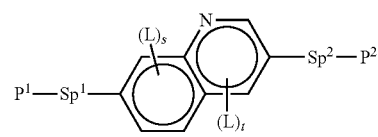

I*6

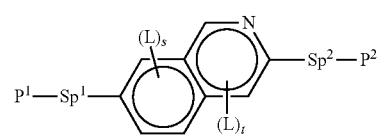

I*7

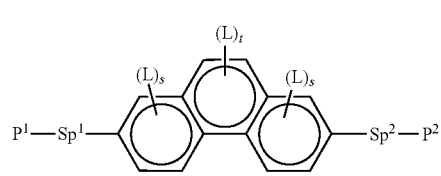

I*8

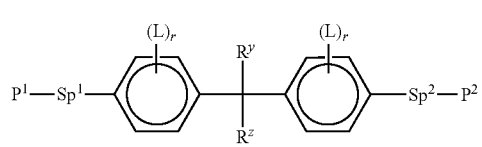

I*9

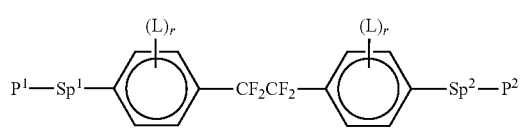

I*10

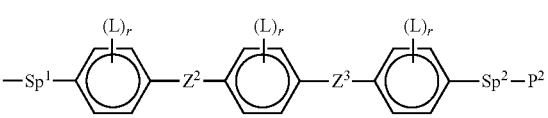

I*11

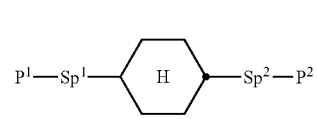

I*12

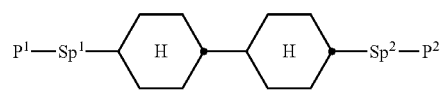

I*13

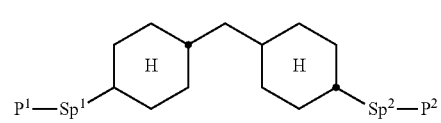

I*14

I*15

-continued

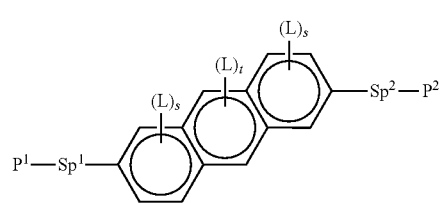
I*16

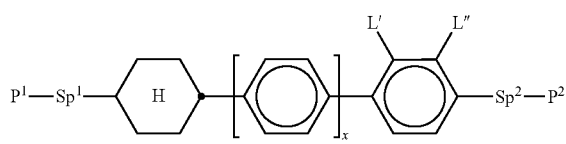
I*17

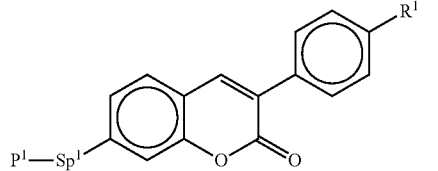
I*18

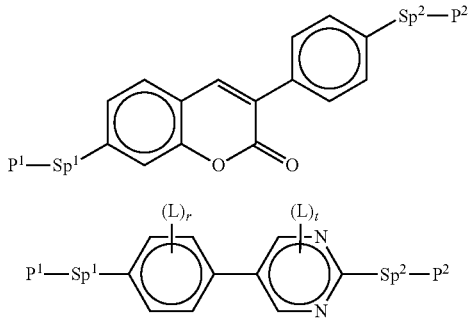
I*19

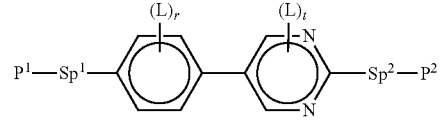
I*20 in which
$R^1$ has one of the meanings indicated for $R^0$ in formula I,
$P^1$ and $P^2$ have one of the meanings indicated for P and preferably denote acrylate or methacrylate,
P denotes a polymerisable group,
$Sp^1$ and $Sp^2$ have one of the meanings indicated for Sp or denote a single bond,
Sp denotes a spacer group,
$Z^2$ and $Z^3$ each, independently of one another, denote —COO— or —COO—,
L denotes P-Sp-, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl or P-Sp-,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1, and
$R^x$ denotes H or CH$_3$.

Preferred spacer groups Sp are selected from the formula Sp'-X', so that the radical "P-Sp-" conforms to the formula "P-Sp'-X'-", where Sp' denotes alkylene having 1 to 20, preferably 1 to 12 C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^0$—, —SiR$^0$R$^{00}$—, —CO—, —COO—, —COO—, —COO—O—, —S—CO—, —CO—S—, —NR$^0$—CO—O—, —O—CO—NR$^0$—, —NR$^0$—CO—NR$^0$—, —CH=CH— or —C≡C— in such a way that O and/or S atoms are not linked directly to one another,
X' denotes —O—, —S—, —CO—, —COO—, —COO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—COO—, —OCO—CH=CH— or a single bond,
$R^0$ and $R^{00}$ each, independently of one another, denote H or alkyl having 1 to 12 C atoms, and
$Y^2$ and $Y^3$ each, independently of one another, denote H, F, Cl or CN.
X' is preferably —O—, —S—, —CO—, —COO—, —COO—, —O—COO—, —CO—NR$^0$—, —NR$^0$—CO—, —NR$^0$—CO—NR$^0$— or a single bond.

Typical spacer groups Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and $R^0$ and $R^{00}$ have the abovementioned meanings.

Particularly preferred groups —X'-Sp'- are —(CH$_2$)$_{p1}$—, —O—(CH$_2$)$_{p1}$—, —OCO—(CH$_2$)$_{p1}$—, —OCOO—(CH$_2$)$_{p1}$—.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Above and below, the following meanings apply:

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound ("RM").

The term "reactive mesogen" or "RM" denotes a compound containing a mesogenic group and one or more functional groups which are suitable for polymerisation (also known as polymerisable group or group P).

The terms "low-molecular-weight compound" and "unpolymerisable compound" denote compounds, usually monomeric, which do not contain any functional group which is suitable for polymerisation under the usual conditions known to the person skilled in the art, in particular under the conditions used for the polymerisation of the RMs.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more heteroatoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more heteroatoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl, $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_2$-$C_{20}$ heteroaryl.

Further preferred carbon and hydrocarbon groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O—, and in which one or more H atoms may be replaced by fluorine, an optionally substituted aryl or aryloxy group having 6 to 40 C atoms or an optionally substituted heteroaryl or heteroaryloxy group having 5 to 40 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl and heteroaryl groups can be monocyclic or polycyclic, i.e. they can have one ring (such as, for example, phenyl) or two or more rings, which may also be fused (such as, for example, naphthyl) or covalently linked (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 2 to 25 C atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those which contain exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 3 to 25 C atoms, which optionally contain fused rings and are optionally substituted. Preference is furthermore given to 5-, 6-, 7- or 8-membered carbocyclic groups in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, in which $R^x$ has the above-mentioned meaning, and $Y^1$ denotes halogen, optionally substituted silyl or aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, in which $R^0$ has the above-mentioned meaning.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

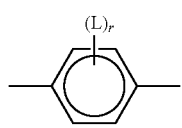

is preferably

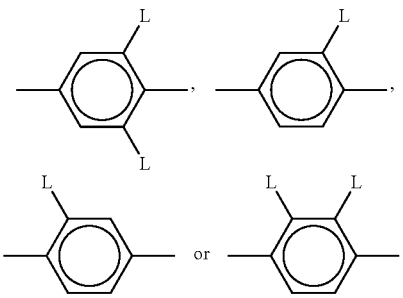

in which L has one of the above-mentioned meanings.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or C≡C triple bond, and groups which are suitable for polymerisation with ring opening, such as, for example, oxetane or epoxide groups.

Preferred groups P are selected from $CH_2$=$CW^1$—COO—, $CH_2$=$CW^1$—CO—,

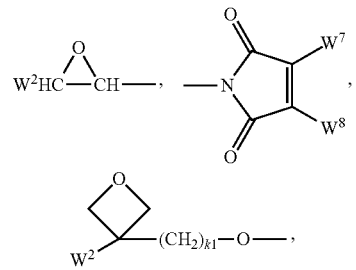

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$, $k_2$ and $k_3$ each, independently of one another, denote 0 or 1, $k_3$ preferably denotes 1.

Particularly preferred groups P are $CH_2$=CH—COO—, $CH_2$=C($CH_3$)—COO—, $CH_2$=CH—, $CH_2$=CH—O—, ($CH_2$=CH)$_2$CH—OCO—, ($CH_2$=CH)$_2$CH—O—,

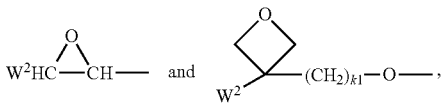

in particular vinyloxy, acrylate, methacrylate, fluoroacrylate, chloroacrylate, oxetane and epoxide.
Especially preferred polymerisable compounds are given in the following:
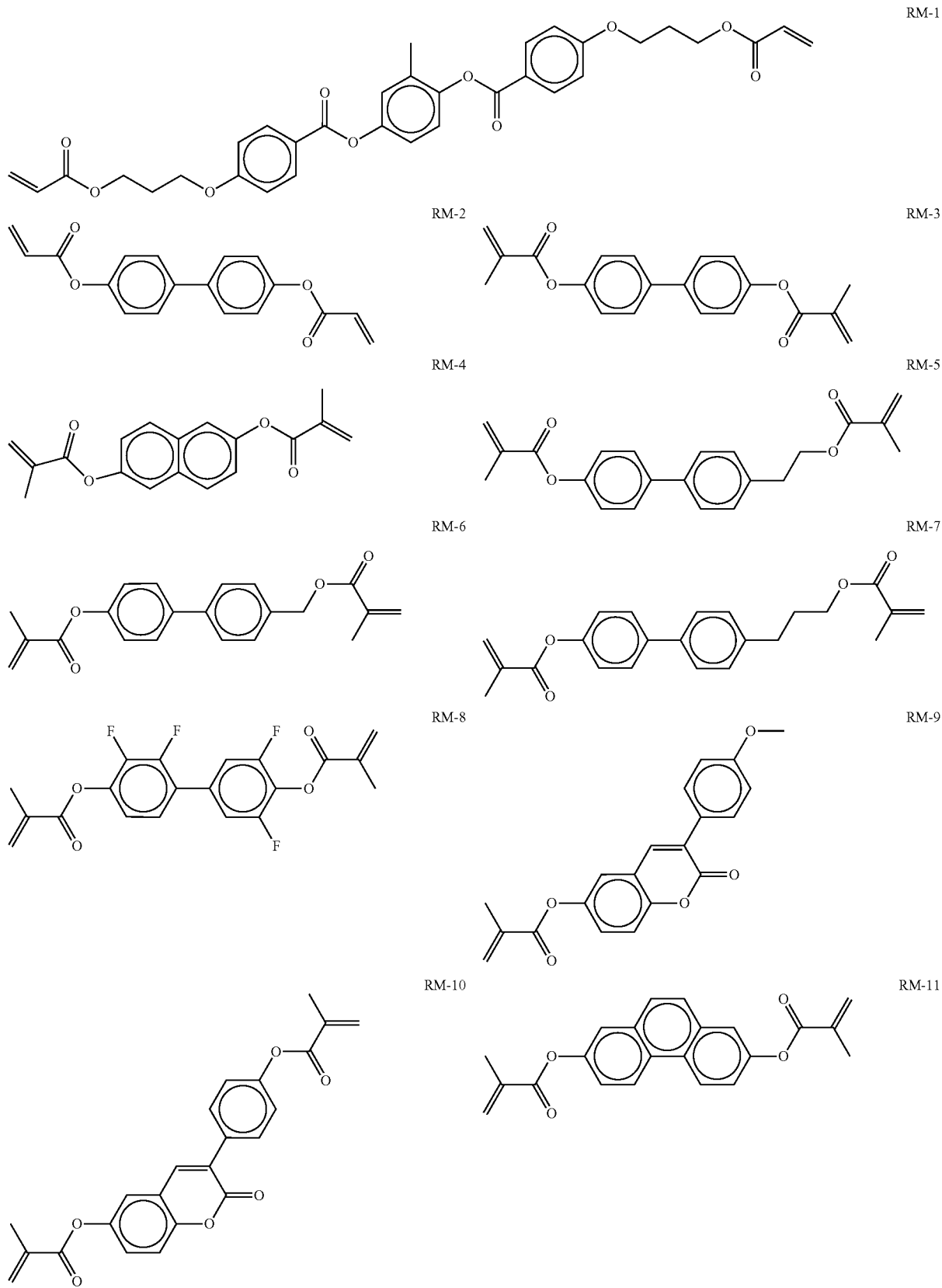

-continued

RM-12

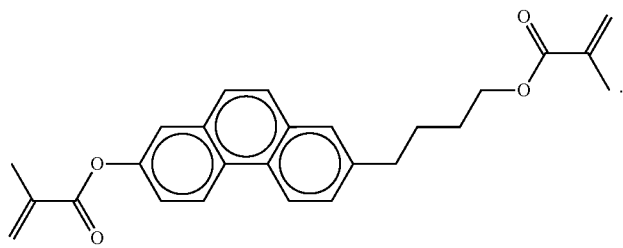

Most preferably preferred are LC mixtures containing a polymerisable compound of the formula RM-2, RM-3, RM-4 or RM-11.

The polymerisable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. The synthesis of polymerisable acrylates and methacrylates of the formula I can be carried out analogously to the methods described in U.S. Pat. No. 5,723,066. Further, particularly preferred methods are given in the examples.

In the simplest case, the synthesis is carried out by esterification or etherification of commercially available diols of the general formula HO-$A^1$-$Z^1$-($A^2$-$Z^2$)$_{m1}$-$A^3$-OH, in which $A^{1-3}$, $Z^{1,2}$ and m1 have the above-mentioned meanings, such as, for example, 1-(3-hydroxyphenyl)phenyl-3-ol, using corresponding acids, acid derivatives, or halogenated compounds containing a group P, such as, for example, (meth) acryloyl chloride or (meth)-acrylic acid, in the presence of a dehydrating reagent, such as, for example, DCC (dicyclohexylcarbodiimide).

The polymerisable compounds are polymerised or cross-linked (if a compound contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts of initiators, are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba Holding).

If an initiator is employed, its proportion in the LC mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component (A) and/or the LC medium (=component (B)) may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba Holding), for example Irganox® 1076. If stabilisers are employed, their proportion, based on the total amount of RMs or polymerisable component (A), is preferably 10-5000 ppm, particularly preferably 50-500 ppm.

The polymerisable compounds according to the invention are particularly suitable for polymerisation without initiator, which is associated with considerable advantages, such as, for example, lower material costs and in particular less contamination of the LC medium by possible residual amounts of the initiator or degradation products thereof.

The LC medium according to the invention preferably contains <5% by weight, particularly preferably <2% by weight, very particularly preferably <1% by weight and very most preferably <0.5% by weight, of polymerisable compounds, based on the LC component (B).

The liquid-crystalline component (B) contains at least one compound of the formula I. The compounds are known, for example from GB 22 29 438 B.

These compounds can either serve as base materials of which liquid-crystalline media are predominantly composed, or they can be added to liquid-crystalline base materials from other classes of compound in order, for example, to modify the dielectric and/or optical anisotropy of a dielectric of this type and/or to optimise its threshold voltage and/or its viscosity and/or its low-temperature behaviour.

The compounds of the formula I reduce, in particular, the threshold voltage and response time of liquid-crystal mixtures according to the invention. Particularly preferred compounds of the formula I are those in which at least one of the radicals $Y^1$ and $Y^2$ is F.

The compounds of the formula I are preferably selected from the following sub-formulae:

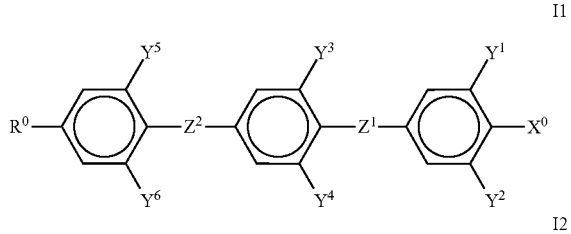

I1

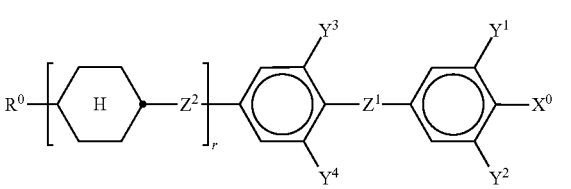

I2

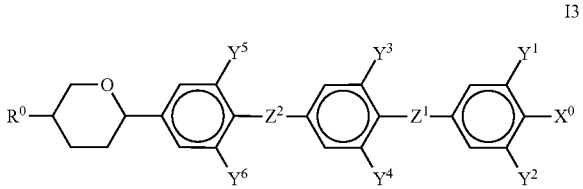

I3

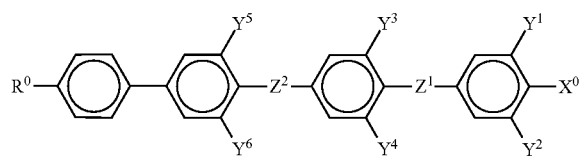

I4

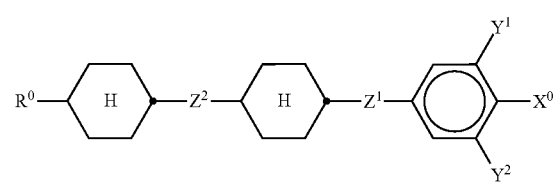

I5 in which $X^0$, $Y^1$ and $Y^2$, $Z^1$, $Z^2$, $R^0$ and r are as defined in the formula I. $R^0$ is preferably n-alkyl, n-alkoxy, n-oxaalkyl, n-fluoroalkyl, n-fluoroalkoxy or n-alkenyl, each having up to 6 carbon atoms.

Particular preference is given to compounds of the formula I1.

Particular preference is given to the compounds of the formulae I1 to I5 wherein $Z^1$ is —CF$_2$O— or —OCF$_2$—, particularly preferably —CF$_2$O—.

Preference is furthermore given to compounds of the formulae I1 to I5 wherein $Z^2$ is a single bond.

Particular preference is given to the following compounds:

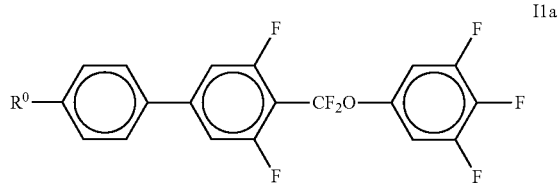

I1a

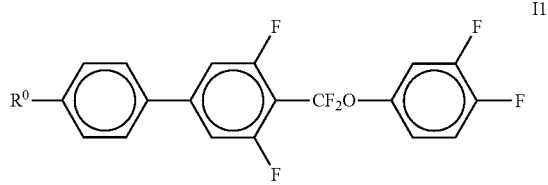

I1b

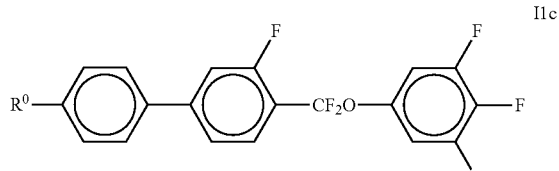

I1c

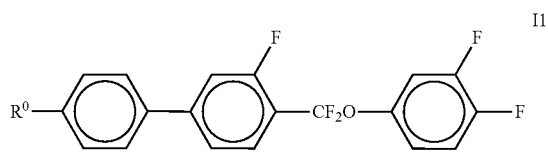

I1d

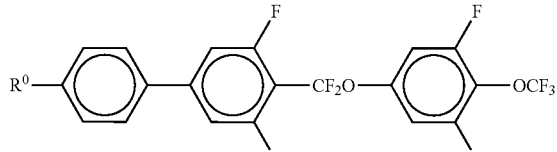

I1e

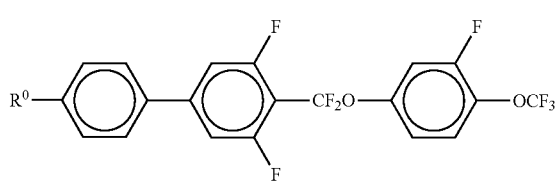

I1f

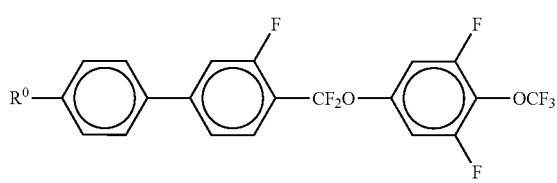

I1g

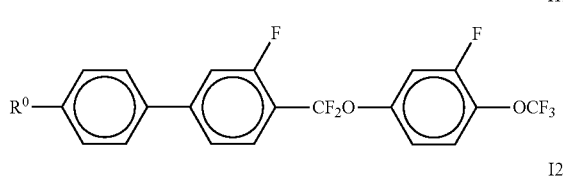

I1h

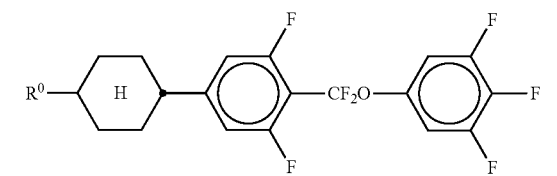

I2a

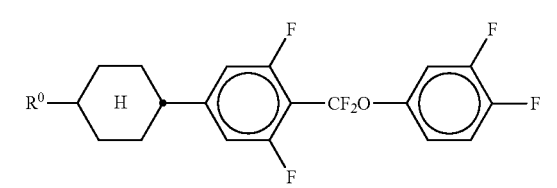

I2b

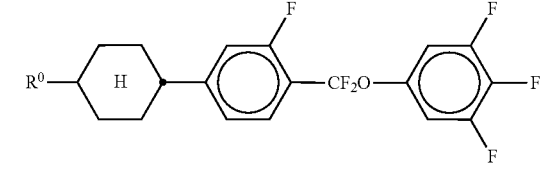

I2c

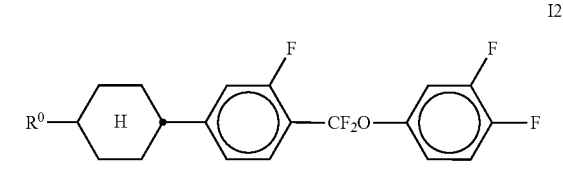

I2d

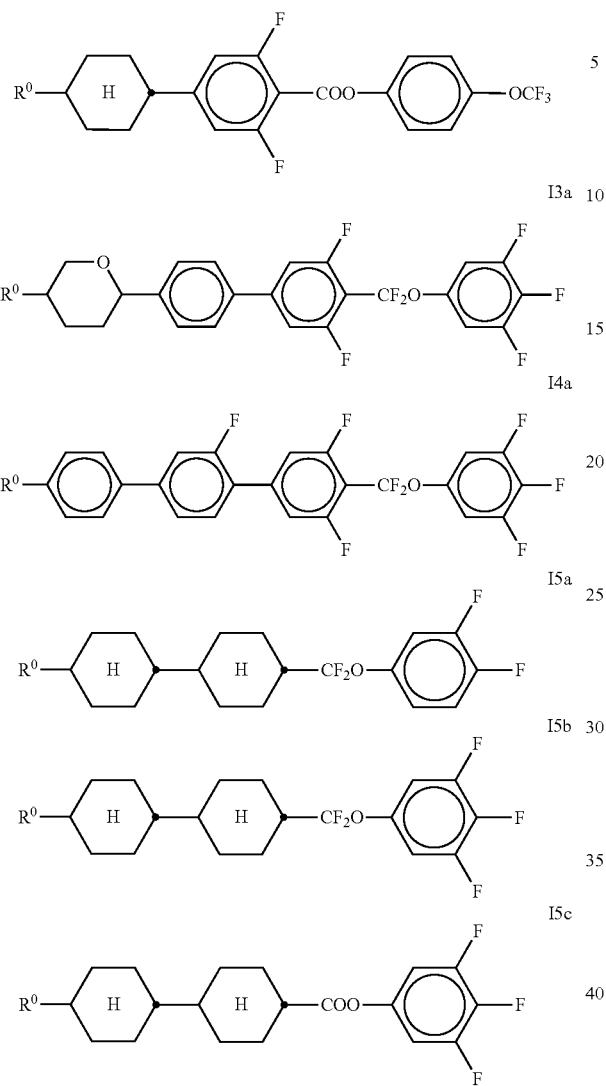

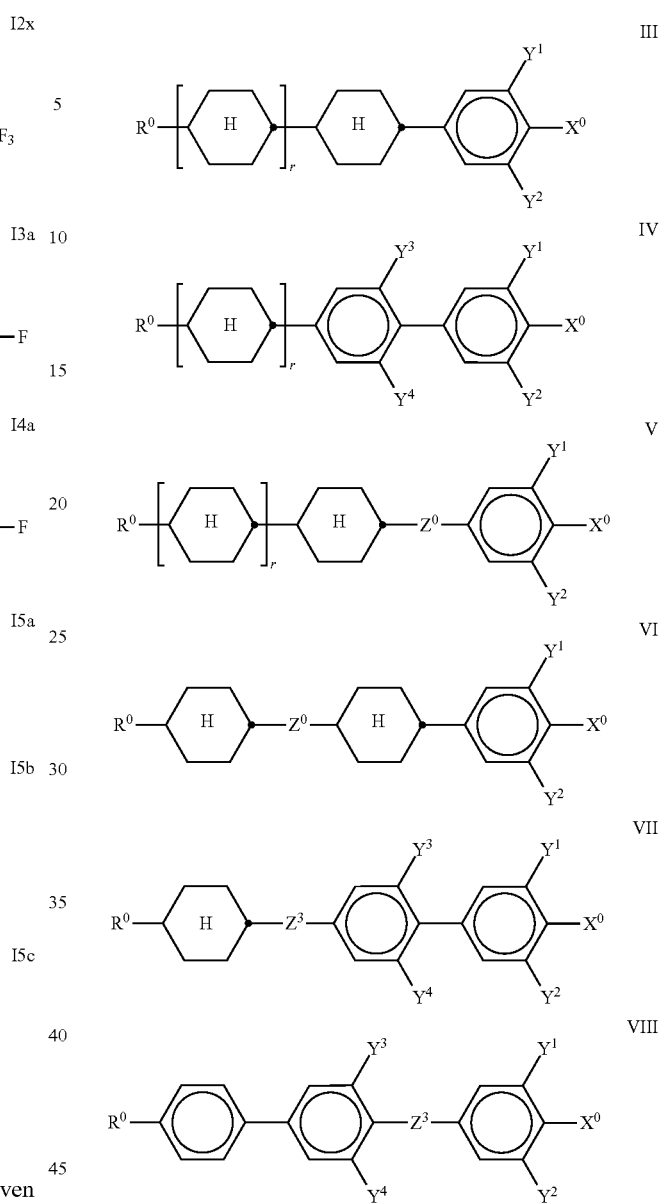

in which $R^0$ is as defined above. Particular preference is given to compounds of the formulae I1a, I2n, I2w, I3a, I4a, I5a, I5b and I5c, especially preferred is the compound of the formula I1a.

The compounds of the formula I are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

In the pure state, the compounds of the formula I are colourless and form liquid-crystalline mesophases in a temperature range which is favourably located for electro-optical use. They are stable chemically, thermally and to light.

Preferred embodiments of the liquid crystalline component (B) are given in the following:

The medium additionally comprises one or more compounds selected from the group consisting of the general formulae III to VIII:

in which r, $X^0$ and $R^0$ are as defined in the formula I, and $Z^0$ is —$C_2F_4$—, —CF=CF, —CH=CF, —CF=CH—, —$C_2H_4$—, —$(CH_2)_4$—, —$OCH_2$— or —$CH_2O$—, and $Z^3$ is —$C_2F_4$—, —CF=CF—, —CH=CF—, —CF=CH—, —$C_2H_4$—, —$(CH_2)_4$—, —$OCH_2$— or —$CH_2O$—.

$Y^1$-$Y^4$ are each independently H or F.

The compound of the formula III is preferably selected from the following formulae:

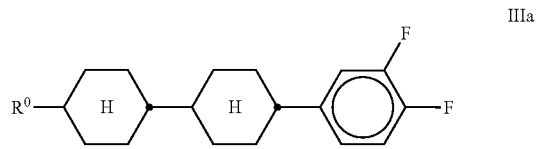

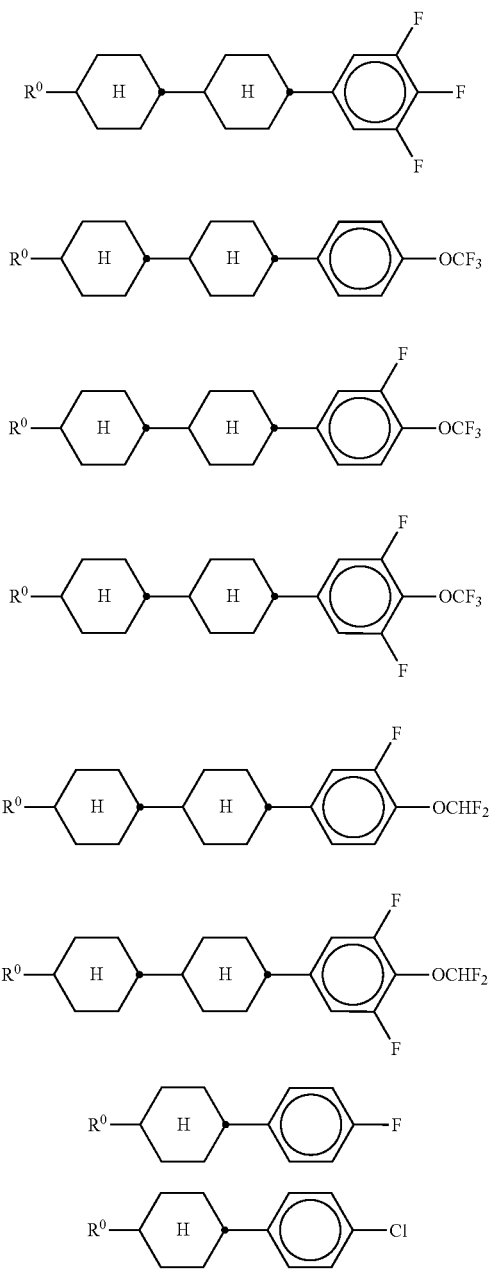

in which R⁰ is as defined in the formula I and is preferably methyl, ethyl, n-propyl, n-butyl or n-pentyl or CH₂=CH.

The compound of the formula IV is preferably selected from the following formulae:

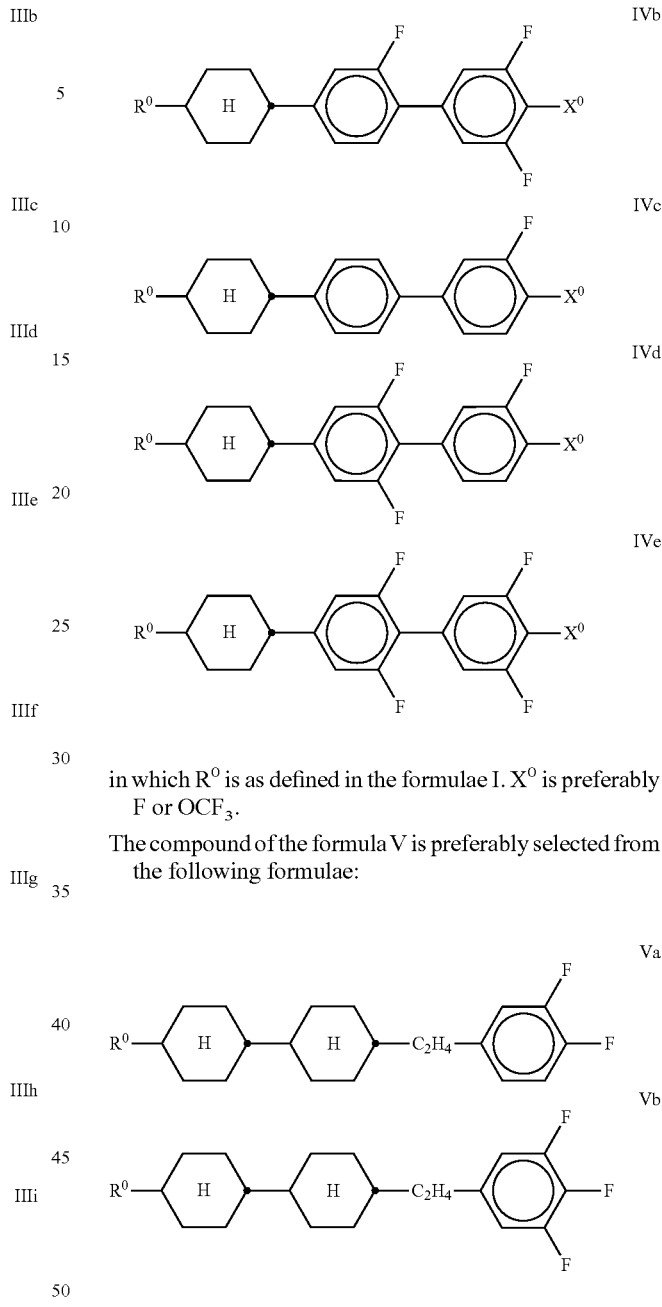

in which R⁰ is as defined in the formulae I. X⁰ is preferably F or OCF₃.

The compound of the formula V is preferably selected from the following formulae:

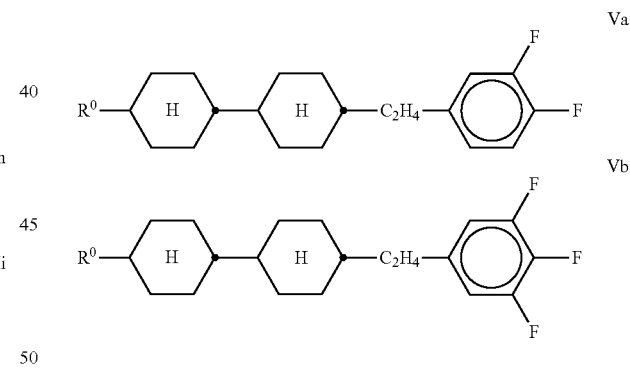

in which R⁰ is as defined in the formula I and is preferably methyl, ethyl, n-propyl, n-butyl or n-pentyl.

The medium additionally comprises one or more compounds selected from the group consisting of the general formulae IX to XV,

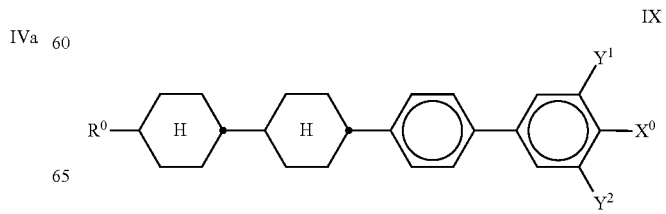

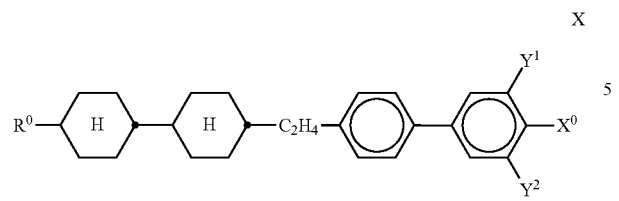

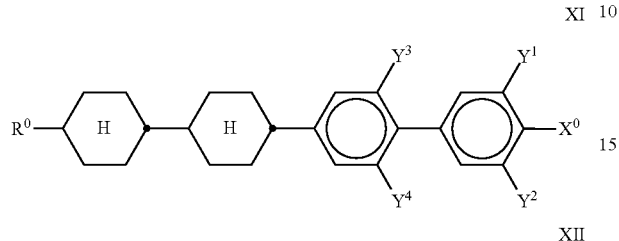

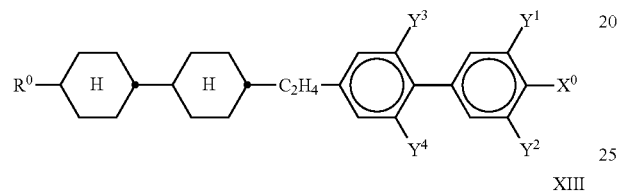

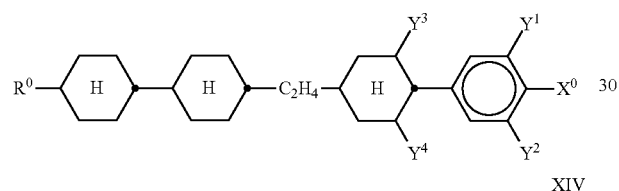

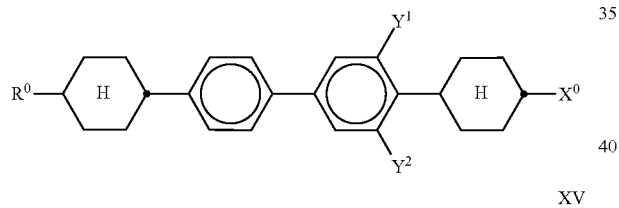

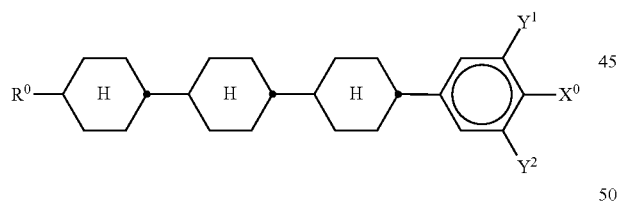

in which $R^0$, $X^0$ and $Y^1$-$Y^4$ are as defined in the formula I. $X^0$ is preferably F, Cl, $CF_3$, $OCF_3$ or $OCHF_2$. $R^0$ is preferably alkyl, alkoxy, oxaalkyl, fluoroalkyl, fluoroalkoxy or alkenyl, each having up to 6 carbon atoms.

The medium additionally comprises one or more compounds selected from the following group consisting of the general formulae XVI to XX:

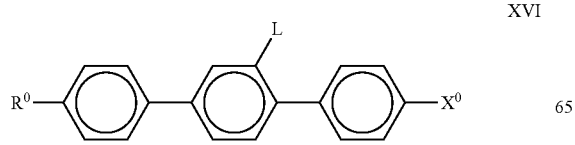

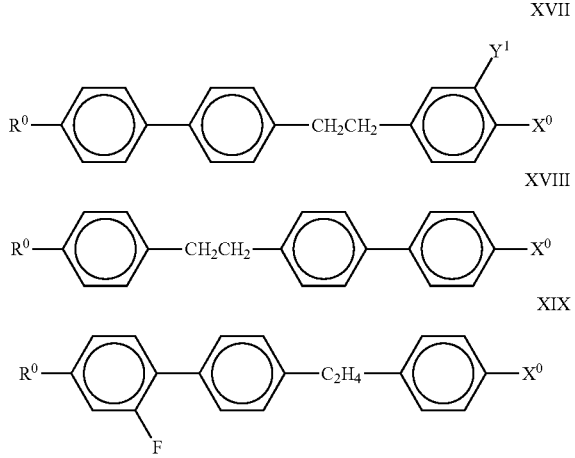

in which $R^0$ and $X^0$ are as defined in the formula I. L is H or F.

The medium additionally comprises one or more bicyclic compounds of the formula XXI

in which $R^5$ and $R^6$ are each, independently of one another, as defined for $R^0$ in formula I.

The compound of the formula XXI is preferably selected from the following formulae:

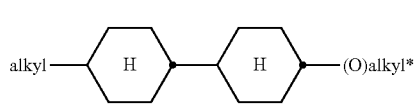

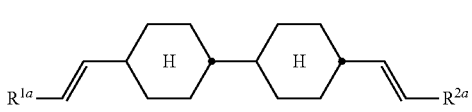

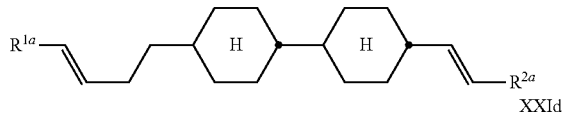

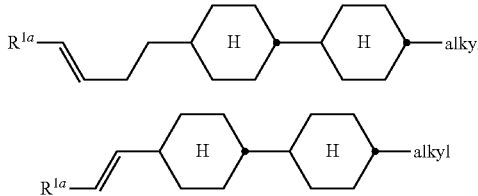

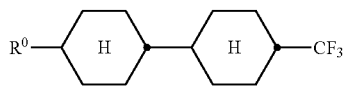
XXIf in which $R^0$ is as defined in the formula I1, and $R^{1a}$ and $R^{2a}$ are each, independently of one another, H, CH$_3$, C$_2$H$_5$ or n-C$_3$H$_7$. "alkyl" and "alkyl*" are each independently a straight-chain alkyl group having 1-6 carbon atoms. Particular preference is given to compounds of the formulae XXIa, XXIb, XXId and XXIe.

Especially preferred compounds of the formulae XXId and XXIe are given in the following:

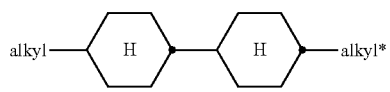
XXIa-1

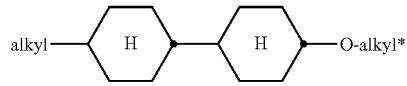
XXIa-2

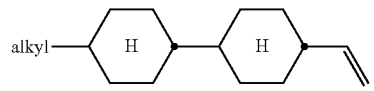
XXIe-1

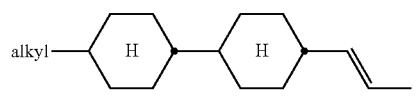
XXIe-2

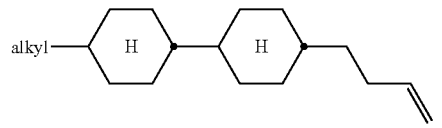
XXId-1

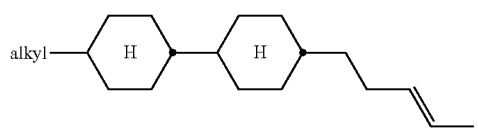
XXId-2

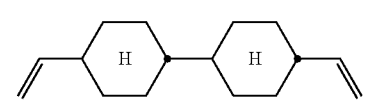
XXIb-1

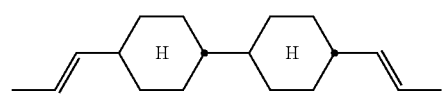
XXIb-2 in which "alkyl" and "alkyl*" have the meanings given above.

The medium additionally comprises one or more alkenyl compounds of the formula IIIa in which $R^0$ is alkenyl having from 2 to 7 carbon atoms, preferably selected from the formula IIIa1

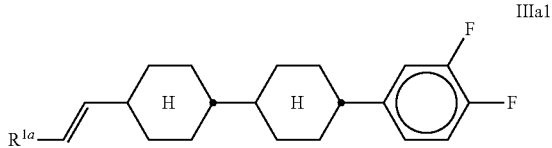
IIIa1 in which $R^{1a}$ is H, CH$_3$, C$_2$H$_5$ or n-C$_3$H$_7$.

The medium additionally comprises one or more, preferably one, two or three, compounds selected from the following formulae:

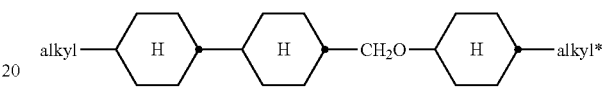
XXII-1

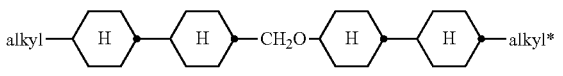
XXII-2

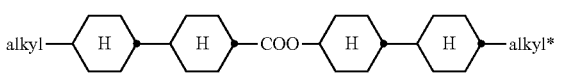
XXII-3 in which "alkyl" and "alkyl*" are as defined below.

The medium additionally comprises one or more compounds of the formula XXIII

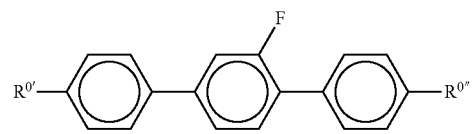
XXIII in which $R^{0'}$ and $R^{0''}$ are each independently a straight chain alkyl residue having 1 to 6 carbon atoms or an alkenyl residue having 2 to 6 carbon atoms.

The medium preferably comprises one or more, particularly preferably one or two, dioxane compounds of the following formulae:

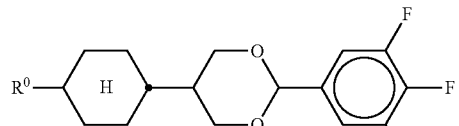
XXIV-1

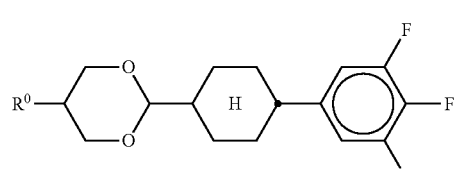
XXIV-2

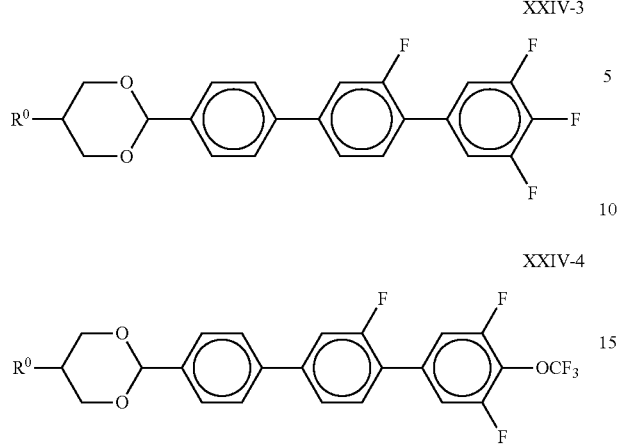

XXIV-3

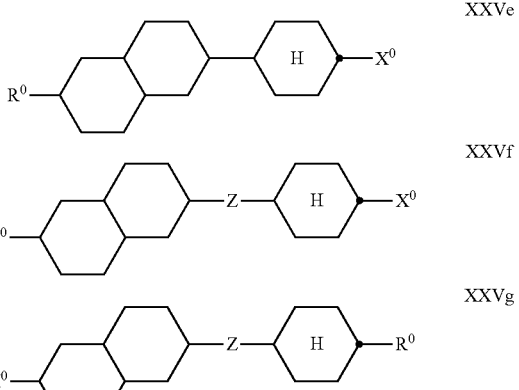

XXVe

XXIV-4

XXVf

XXVg

The medium preferably comprises one or more decalin compounds of the formula XXV

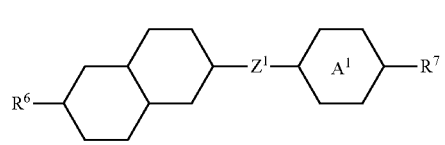

XXV in which $R^6$ and $R^7$ are each, independently of one another, $R^0$ or $X^0$, and $X^0$, $A^1$, $Z^1$ and $R^0$ are as defined in the formula I.

The compounds of the formula XXV are preferably selected from the following formulae:

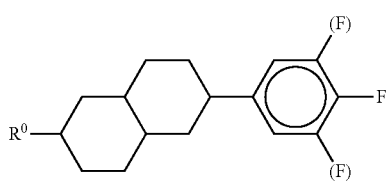

XXVa

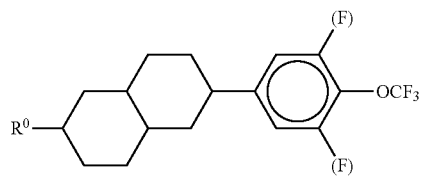

XXVb

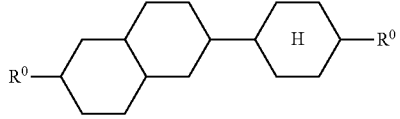

XXVc

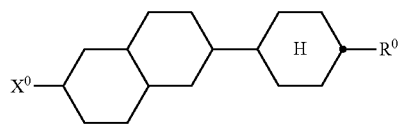

XXVd in which $X^0$ and $R^0$ are as defined in the formula I, and Z is —CH$_2$O—, —OCH$_2$—, —COO—, —C≡C—, —CH=CH—, —CF$_2$O—, —OCF$_2$—, —CF=CF—, —C$_2$F$_4$—, —CH=CH—(CH$_2$)$_2$— or —(CH$_2$)$_4$—, preferably —C$_2$F$_4$—, and (F) is H or F.

$R^0$ in these preferred formulae is preferably straight-chain alkyl having from 1 to 8 carbon atoms or straight-chain alkenyl having from 2 to 7 carbon atoms.

$X^0$ in these preferred formulae is preferably —CF$_3$, —C$_2$F$_5$, —C$_3$F$_7$, —OCF$_3$, —CH=CHF, —(CH$_2$)$_n$—CH=CHF, —CH=CF$_2$, —(CH$_2$)$_n$—CH=CF$_2$, —CF=CF$_2$, —(CH$_2$), —CF=CF$_2$, —OCH=CHF, —OCH=CF$_2$ or —OCF=CF$_2$.

If one of the radicals $R^0$ in the formulae above and below is an alkyl radical and/or an alkoxy radical, this may be straight-chain or branched. It is preferably straight-chain, has 2, 3, 4, 5, 6 or 7 carbon atoms and accordingly is particularly preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If one of the radicals $R^0$ is an alkyl radical in which one CH$_2$ group has been replaced by —CH=CH—, this may be straight-chain or branched. It is preferably straight-chain and has from 2 to 10 carbon atoms. Accordingly, it is particularly preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If one of the radicals $R^0$ is an alkyl radical in which one CH$_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms. Accordingly, they are particularly preferably acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If one of the radicals $R^0$ is an alkyl radical in which two or more $CH_2$ groups have been replaced by —O— and/or —CO—O—, this may be straight-chain or branched. It is preferably branched and has from 3 to 12 carbon atoms. Accordingly, it is particularly preferably biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)-methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis-(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis-(ethoxycarbonyl)pentyl.

If one of the radicals $R^0$ is an alkyl radical in which one $CH_2$ group has been replaced by unsubstituted or substituted —CH=CH— and an adjacent $CH_2$ group has been replaced by CO, CO—O or O—CO, this may be straight-chain or branched. It is preferably straight-chain and has from 4 to 13 carbon atoms. Accordingly, it is particularly preferably acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the radicals $R^0$ is an alkyl or alkenyl radical which is monosubstituted by CN or $CF_3$, this radical is preferably straight-chain. The substitution by CN or $CF_3$ is possible in any desired position.

If one of the radicals $R^0$ is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^0$ may be of importance owing to better solubility in the conventional liquid-crystalline base materials, but in particular as chiral dopants if they are optically active.

Smectic compounds of this type are suitable as components of ferroelectric materials.

Branched groups of this type preferably contain not more than one chain branch. Preferred branched radicals $R^0$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

The invention also relates to the use of the liquid-crystal media according to the invention for electro-optical purposes, and to electro-optical displays, in particular STN and MLC displays, having two plane-parallel outer plates, which, together with a frame, form a cell, integrated non-linear elements for switching individual pixels on the outer plates, and a nematic liquid-crystal mixture of high specific resistance which is located in the cell, which contain liquid-crystal media according to the invention.

The liquid-crystal media according to the invention enable a significant widening of the available parameter latitude. In particular, the achievable combinations of clearing point, viscosity at low temperature, thermal and UV stability and optical anisotropy and threshold voltage are far superior to previous materials from the prior art.

The liquid-crystal media according to the invention preferably have a nematic phase down to −20° C., particularly preferably down to −30° C. and in particular down to −40° C., and clearing points above 70° C., particularly preferably above 75° C. and in particular above 80° C. Their nematic phase range preferably covers at least 90° C. and particularly preferably at least 100° C. This range preferably extends at least from −30° C. to +80° C.

The dielectric anisotropy Δ∈ of the liquid-crystal media according to the invention is preferably ≥5, particularly preferably ≥8 and in particular ≥10. Liquid-crystal media according to the invention for TN and STN displays preferably have birefringence values of Δn>0.07, particularly preferably ≥0.08, and preferably ≤0.2, particularly preferably ≤0.16, in particular between 0.085 and 0.15. Liquid-crystal media according to the invention for reflective and transflective displays preferably have birefringence values of ≤0.08, particularly preferably ≤0.07 and in particular ≤0.065.

The TN thresholds of the liquid-crystal media according to the invention are generally at 1.7 V, preferably below 1.5 V.

The rotational viscosity $\gamma_1$ of the liquid-crystal media according to the invention at 20° C. is preferably <150 mPas and particularly preferably <100 mPas.

It goes without saying that, through a suitable choice of the components of the mixtures according to the invention, it is also possible for higher clearing points (for example above 110° C.) to be achieved at lower dielectric anisotropy values and thus for higher threshold voltages or lower clearing points to be achieved at higher dielectric anisotropy values (for example >12) and thus for lower threshold voltages (for example <1.5 V) to be achieved while retaining the other advantageous properties. At viscosities correspondingly increased only slightly, it is likewise possible to obtain mixtures having greater Δ∈ and thus lower thresholds.

Measurements of the voltage holding ratio (VHR), also known as the capacity holding ratio [S. Matsumoto et al., Liquid Crystals 5, 1320 (1989); K. Niwa et al., Proc. SID Conference, San Francisco, June 1984, p. 304 (1984); T. Jacob and U. Finkenzeller in "Merck Liquid Crystals— Physical Properties of Liquid Crystals", 1997], have shown that the liquid-crystal media according to the invention comprising compounds of the formula I and UV stabilisers, in particular those of the formula II, have an adequate VHR for MLC displays.

In particular, liquid-crystal media according to the invention comprising compounds of the formula I exhibit a significantly smaller decrease in the VHR with increasing temperature than analogous media comprising compounds containing a cyano group or 4-cyanophenyl group, such as, for example, cyanophenylcyclohexanes of the formula

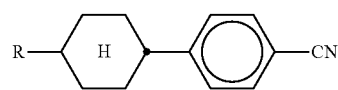

or esters of the formula

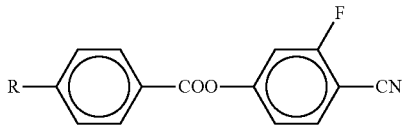

instead of the compounds of the formula I.

The UV stability of the liquid-crystal media according to the invention is also considerably better, i.e. they exhibit a significantly smaller decrease in the VHR on exposure to UV.

The voltage holding ratio VHR of the liquid-crystal media according to the invention after heating at 100° C./5 minutes is preferably >90%, particularly preferably >94%, very particularly preferably >96% and in particular >98%.

The VHR values relate, unless stated otherwise, to the measurement method of T. Jacob and U. Finkenzeller in "Merck Liquid Crystals—Physical Properties of Liquid Crystals", 1997.

The liquid-crystal media according to the invention preferably comprise less than 25% by weight, particularly preferably less than 15% by weight and in particular less than 5% by weight, of compounds containing one or more cyano groups, in particular mesogenic or liquid-crystalline compounds of this type. Very particular preference is given to liquid-crystal media comprising no compounds containing one or more cyano groups.

The transmissive MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (DE 30 22 818), a lower dielectric anisotropy is sufficient at the same threshold voltage as in an analogous display at the second minimum. This enables significantly higher specific resistance values to be achieved using the mixtures according to the invention at the first minimum than, for example, in the case of mixtures comprising cyano compounds.

The reflective or transflective MLC displays according to the invention operate in a parameter latitude, optimised with respect to contrast ratio and optical dispersion, consisting of the values of the product d Δn, twist angle Φ of the liquid crystal, direction of the fast axis of the retardation film regarding the substrate rubbing directions and polariser transmission direction. The requirements of reflective MLC displays have been indicated, for example, in Digest of Technical Papers, SID Symposium 1998. The person skilled in the art is able to set the birefringence necessary for a pre-specified layer thickness of the MLC display through a suitable choice of the individual components and their proportions by weight using simple routine methods.

Preferred embodiments are indicated below:
The medium comprises from one to four, in particular one, two or three, compounds of the formula I.
The medium comprises one or more compounds of the formula IIa.
The proportion of the compounds of the formula I in the mixture as a whole is preferably in the range from 2 to 30% by weight, particularly preferably from 3 to 25% by weight and in particular from 4 to 20% by weight.

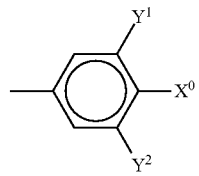

is preferably

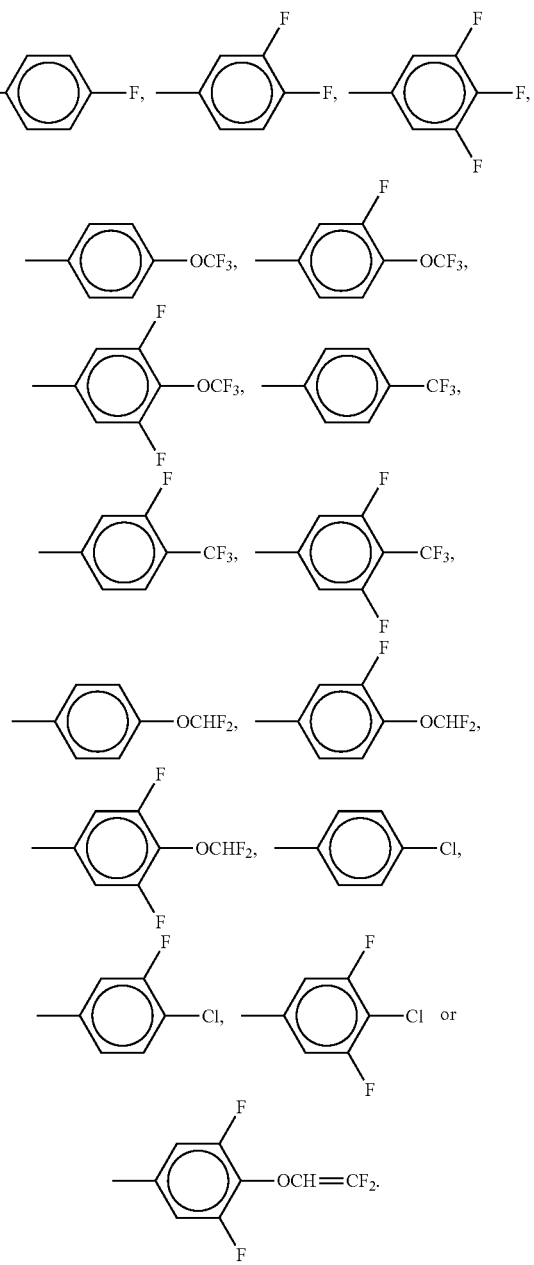

$R^0$ is straight-chain alkyl having from 1 to 8 carbon atoms or alkenyl having from 2 to 7 carbon atoms.
The medium comprises compounds of the formulae III, IV, V, VI, VII and/or VIII.
The medium essentially consists of compounds of the formulae I to VIII and XXI to XXIII.

The proportion of compounds of the formulae I to VIII together in the mixture as a whole is at least 50% by weight.

The medium essentially consists of compounds selected from the group consisting of the general formulae I to XXV.

The compounds of the formulae I to XXV are colourless and stable and readily miscible with one another and with other liquid-crystal materials.

The individual compounds of the formulae I to XXV and their sub-formulae which can be used in the media according to the invention are either known or can be prepared analogously to known compounds.

The term "alkyl" or "alkyl*" covers straight-chain and branched alkyl groups having from 1 to 7 carbon atoms, preferably the straight-chain groups methyl, ethyl, propyl, butyl, pentyl, hexyl and heptyl. However, groups having from 2 to 5 carbon atoms are particularly preferred.

The term "alkenyl" or "alkenyl*" covers straight-chain and branched alkenyl groups having from 2 to 7 carbon atoms, preferably the straight-chain groups. Particularly preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl and 6-heptenyl. In particular, however, groups having up to 5 carbon atoms are preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m=1 to 6.

The radical "(F)" in one of the structural formulae mentioned above and below is F or H.

The term

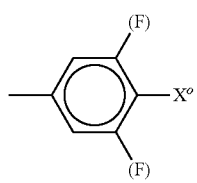

denotes

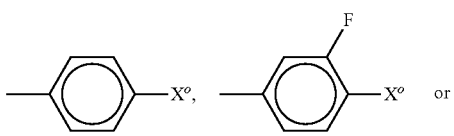

-continued

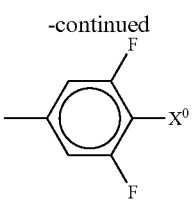

wherein
$X^0$ has one of the meanings given for formula I $X^0$ is preferably F or $OCF_3$.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals and 2E-alkenyloxy radicals generally result in shorter addressing times, improved nematic tendencies and a higher ratio of the elastic constants $k_{33}$ (bend) and $k_{11}$ (splay) compared with alkyl and alkoxy radicals. 4-Alkenyl radicals and 3-alkenyl radicals generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I to XXV depends substantially on the desired properties, on the choice of the individual compounds of these formulae and on the choice of any other components that may be present. Suitable mixing ratios within the range given above can easily be determined from case to case.

The total amount of compounds of the formulae I to XXV in the mixtures according to the invention is not crucial. The mixtures can therefore comprise one or more further components for the purposes of optimisation of various properties. However, the observable effect in relation to the addressing times and the threshold voltage is generally greater, the higher the total concentration of compounds of the formulae I to XXV.

It has been found that even a relatively small proportion of compounds of the formulae I and II mixed with conventional liquid-crystal materials, but in particular with one or more compounds of the formulae III, IV, V, VI, VII and/or VIII, results in a considerable lowering of the threshold voltage and in low birefringence values, with broad nematic phases with low smectic-nematic transition temperatures being observed at the same time, improving the shelf life.

In a particularly preferred embodiment, the media according to the invention comprise compounds of the formulae II to XVIII (preferably II, III and/or IV) in which $X^0$ is F, $OCF_3$, $OCHF_2$, $OCH=CF_2$, $OCF=CF_2$ or $OCF_2$—$CF_2H$. A favourable synergistic effect with the compounds of the formula I results in particularly advantageous properties.

The construction of the STN and MLC displays according to the invention from polarisers, electrode base plates and surface-treated electrodes corresponds to the conventional construction for displays of this type. The term conventional construction is broadly drawn here and also covers all derivatives and modifications of the MLC display, in particular including matrix display elements based on poly-Si TFT or MIM and very particularly transflective and reflective displays.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example by using premixes, such as, for example, homologue mixtures or using so-called "multibottle" systems.

The polymerisable compounds can be added individually to the liquid crystalline medium, but it is also possible to use mixtures comprising two or more polymerisable compounds. The polymerisable compounds are polymerised or crosslinked (if a compounds contains two or more polymerisable groups) by in-situ polymerisation in the LC medium between the substrates of the LC display with application of a voltage. Suitable and preferred polymerisation methods are, for example, thermal or photopolymerisation, preferably photopolymerisation, in particular UV photopolymerisation. If necessary, one or more initiators may also be added here. Suitable conditions for the polymerisation, and suitable types and amounts or initiators, are known to the person skilled in the art and are described in the literature.

Suitable for free-radical polymerisation are, for example, the commercially available photoinitiators Irgacure651®, Irgacure184®, Irgacure907®, Irgacure369® or Darocure1173® (Ciba Holding). If an initiator is employed, its proportion in the mixture as a whole is preferably 0.001 to 5% by weight, particularly preferably 0.001 to 1% by weight. However, the polymerisation can also take place without addition of an initiator. In a further preferred embodiment, the LC medium does not comprise a polymerisation initiator.

The polymerisable component (=total amount of RMs) in the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers of the Irganox® series (Ciba Holding). If stabilisers are employed, their proportion, based on the total amount of RMs or polymerisable component A, is preferably 10-5000 ppm, particularly preferably 50-500 ppm.

The dielectrics may also comprise further additives known to the person skilled in the art and described in the literature. For example, from 0 to 15%, preferably from 0 to 10%, of pleochroic dyes and/or chiral dopants, or UV stabilisers, for example those listed in Table D can be added. Especially preferred is the UV stabilizer Tinuvin 770 of Ciba Holding. The individual compounds added are employed in concentrations of from 0.01 to 6%, preferably from 0.1 to 3%. However, the concentration data of the other constituents of the liquid-crystal mixtures, i.e. the liquid-crystalline or mesogenic compounds, are given without taking into account the concentration of these additives.

The invention thus relates to a liquid-crystal (LC) display of the PS (polymer stabilised) or PSA (polymer sustained alignment) type, containing an LC cell consisting of two substrates, where at least one substrate is trans-parent to light and at least one substrate has an electrode layer, and a layer of an LC medium comprising a polymerised component and a low-molecular-weight component located between the substrates, where the polymerised component is obtainable by polymerisation of one or more polymerisable compounds between the substrates of the LC cell in the LC medium with application of an electrical voltage, characterised in that at least one of the polymerisable compound.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. n and m are each, independently of one another, an integer, preferably 0, 1, 2, 3, 4, 5, 6, 7, 8, 9 or 10. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | F | H |
| nN•F•F | $C_nH2_{n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF•F | $C_nH_{2n+1}$ | F | F | H |
| nF•F•F | $C_nH_{2n+1}$ | F | F | F |
| nOCF3 | $C_nH_{2n+1}$ | $OCF_3$ | H | H |
| nOCF3•F | $C_nH_{2n+1}$ | $OCF_3$ | F | H |
| n—Vm | $C_nH_{2n+1}$ | —CH=CH—$C_mH_{2m+1}$ | H | H |
| nV—Vm | $C_nH_{2n+1}$—CH=CH— | —CH=CH—$C_mH_{2m+1}$ | H | H |

Preferred mixtures of the component (B) contain one or more compounds of the formula I and one or more compounds selected from the group of compounds listed in the tables A and B.

TABLE A

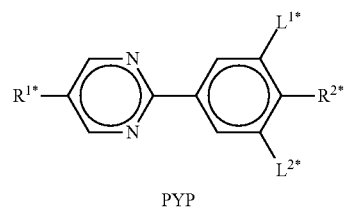

PYP

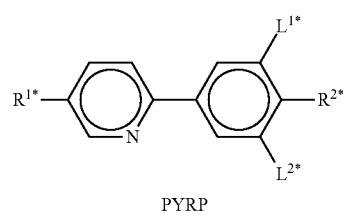

PYRP

TABLE A-continued
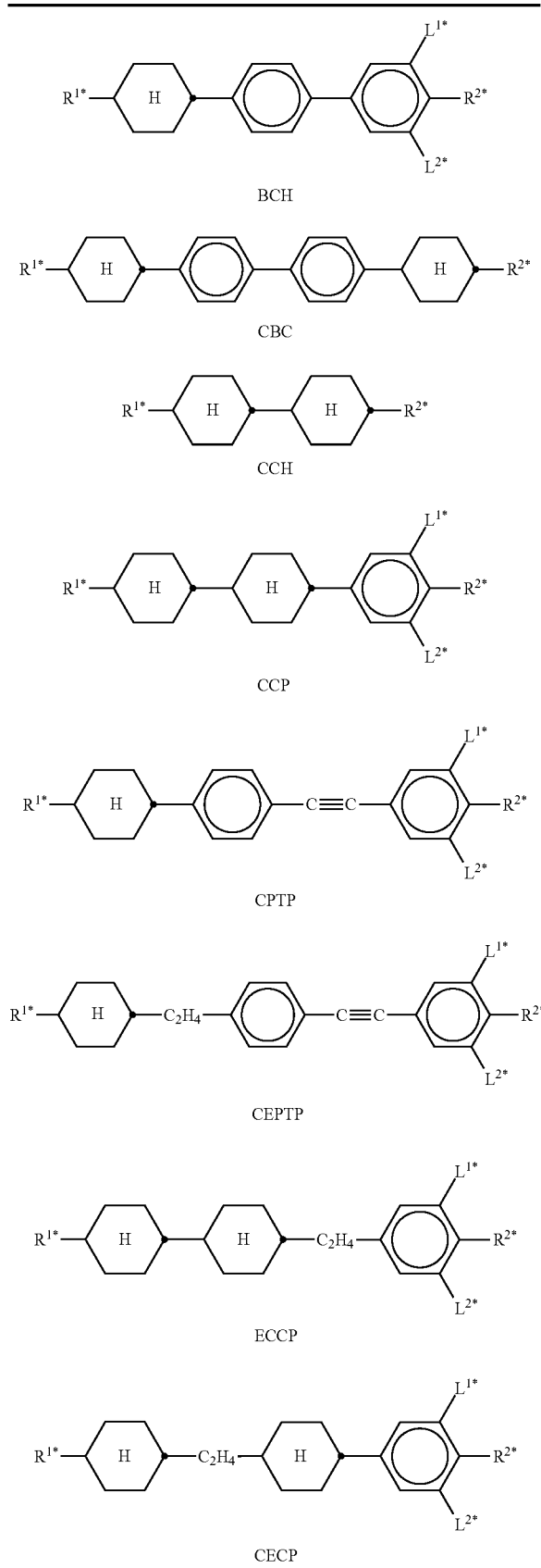
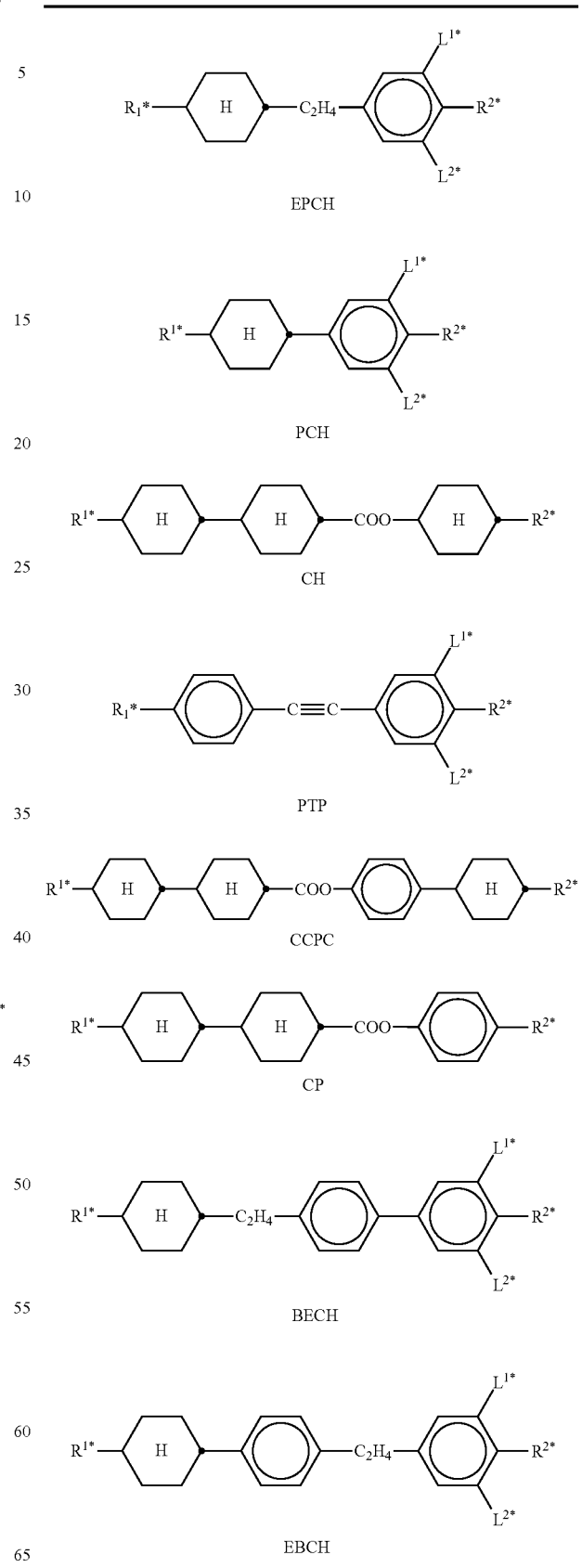

TABLE A-continued
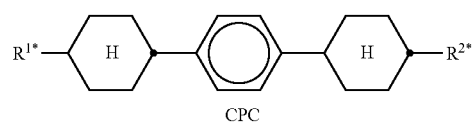
CPC
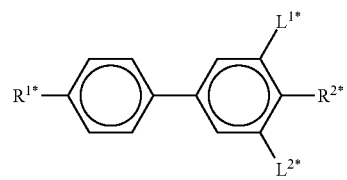
B
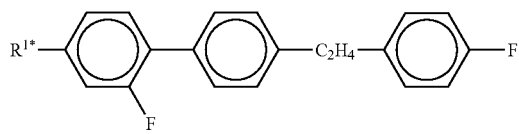
FET-nF
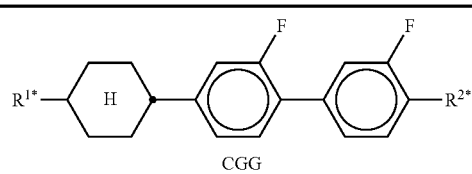
CGG
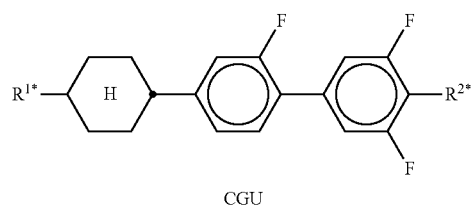
CGU
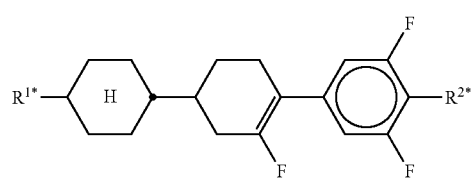
CFU
TABLE B
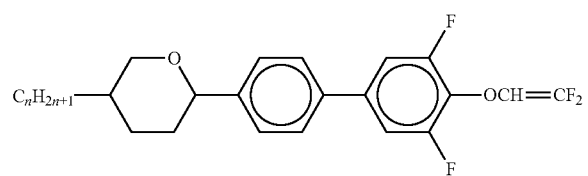
APU-n-OXF
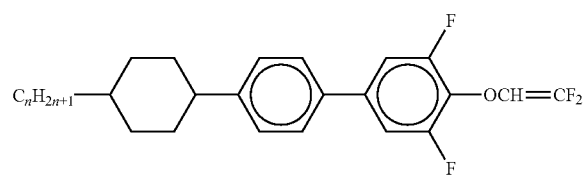
CPU-n-OXF
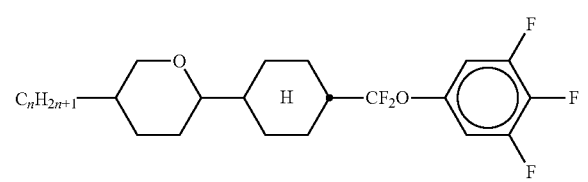
ACQU-n-F
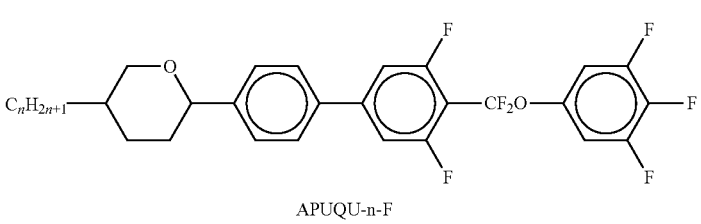
APUQU-n-F TABLE B-continued
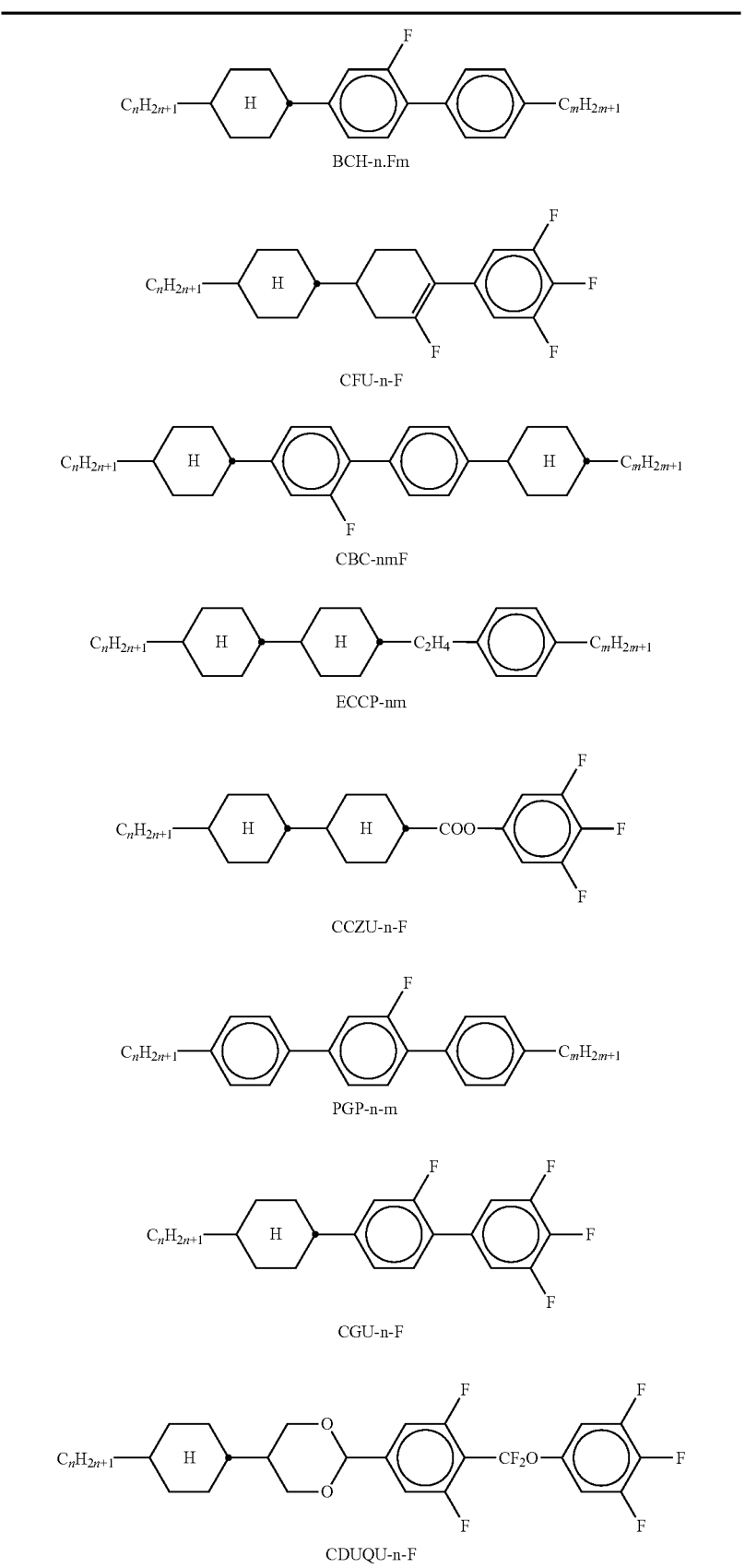

TABLE B-continued
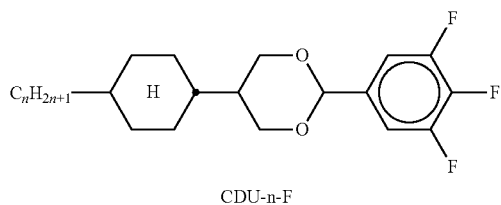
CDU-n-F
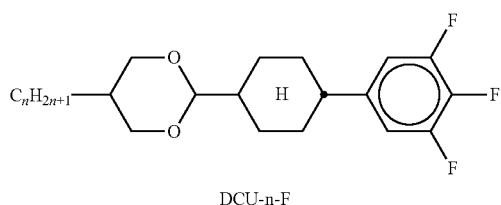
DCU-n-F
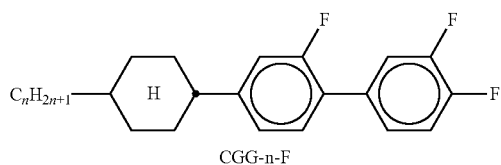
CGG-n-F
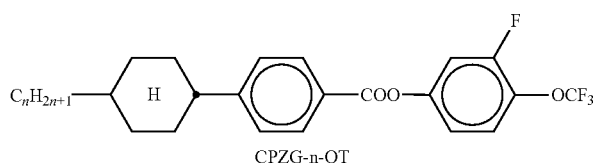
CPZG-n-OT
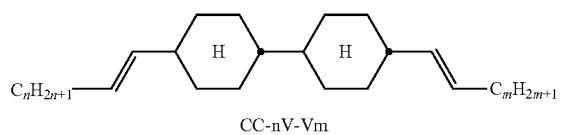
CC-nV-Vm
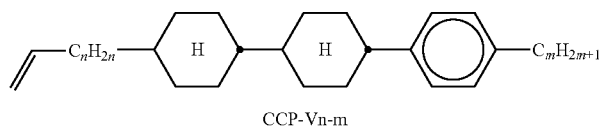
CCP-Vn-m
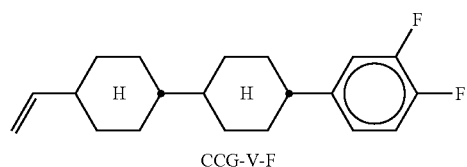
CCG-V-F
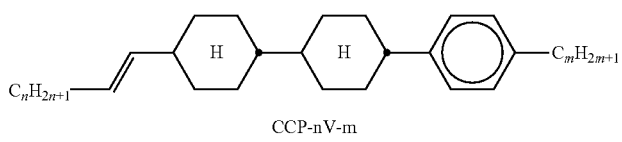
CCP-nV-m
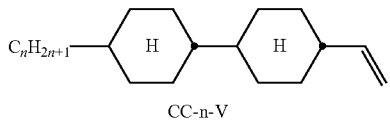
CC-n-V TABLE B-continued
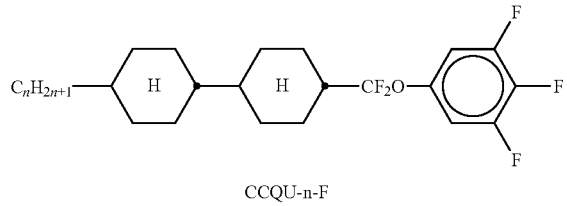
CCQU-n-F
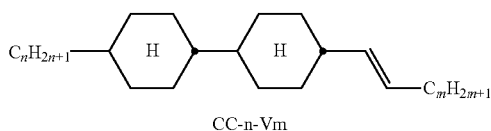
CC-n-Vm
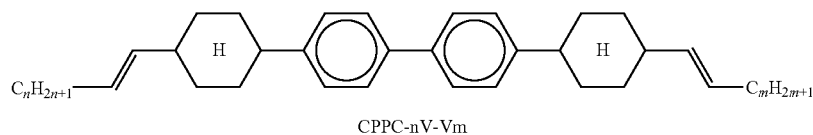
CPPC-nV-Vm
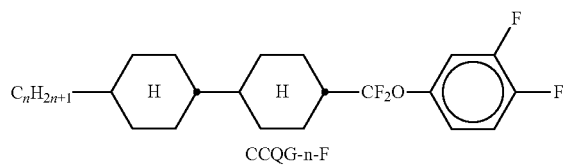
CCQG-n-F
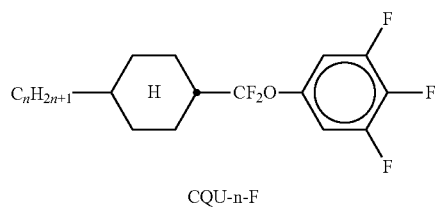
CQU-n-F
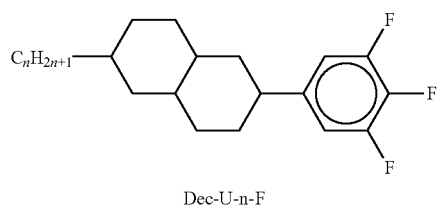
Dec-U-n-F
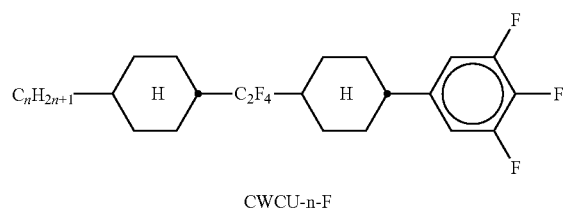
CWCU-n-F
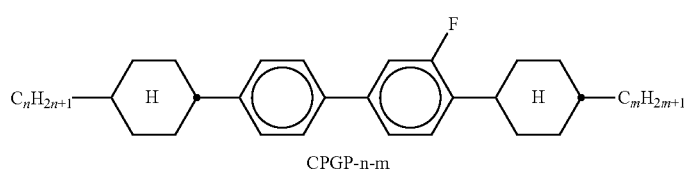
CPGP-n-m TABLE B-continued
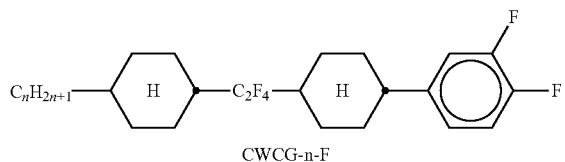
CWCG-n-F
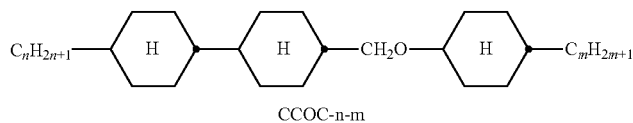
CCOC-n-m
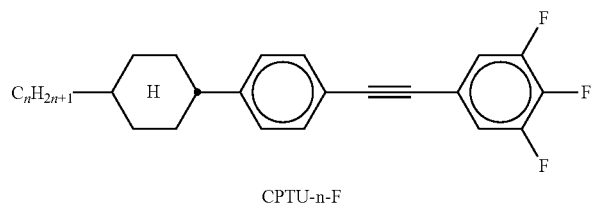
CPTU-n-F
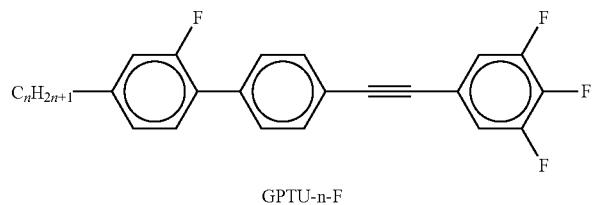
GPTU-n-F
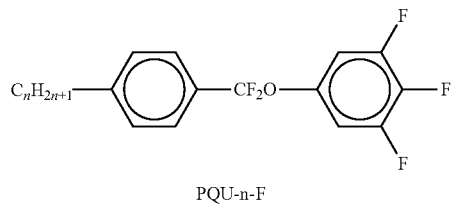
PQU-n-F
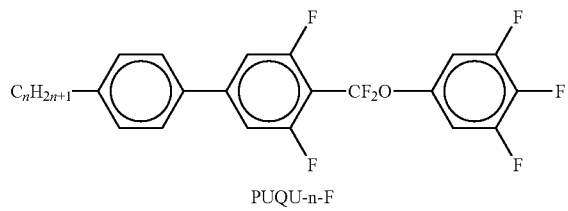
PUQU-n-F
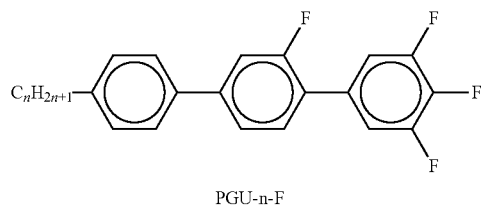
PGU-n-F
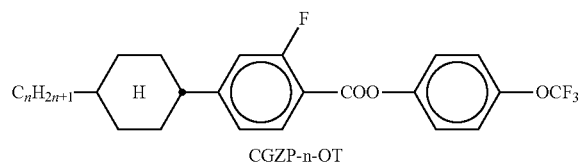
CGZP-n-OT TABLE B-continued
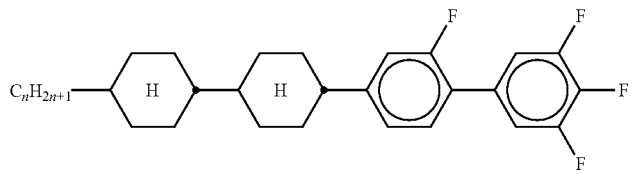
CCGU-n-F
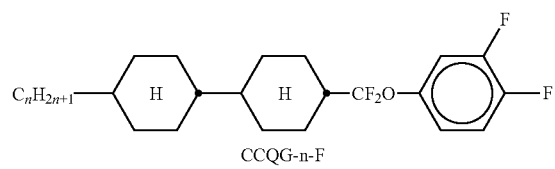
CCQG-n-F
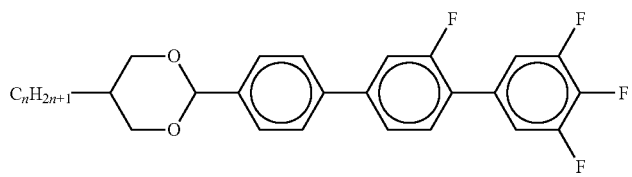
DPGU-n-F
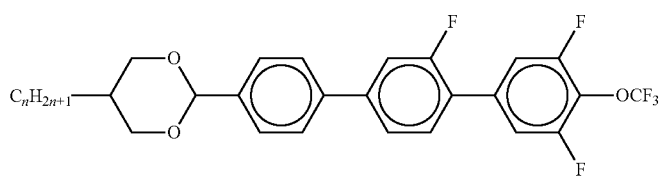
DPGU-n-OT
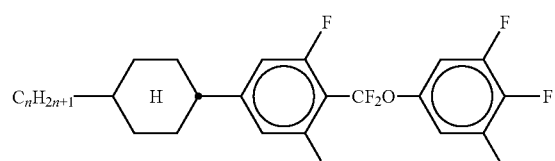
CUQU-n-F
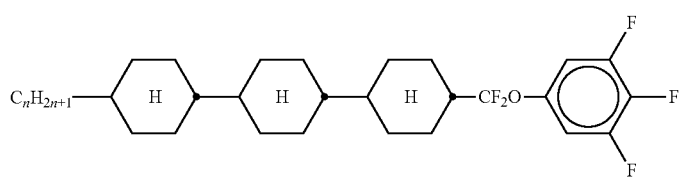
CCCQU-n-F
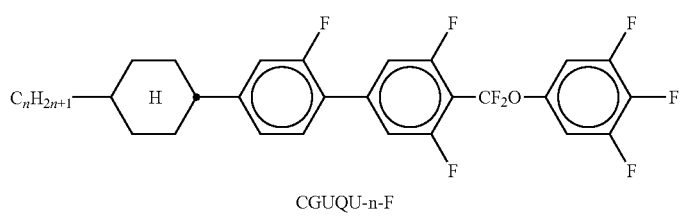
CGUQU-n-F TABLE B-continued
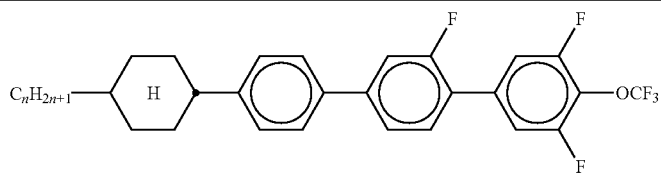
CPGU-n-OT
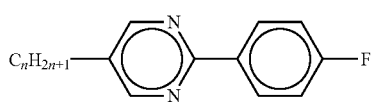
PYP-n-F
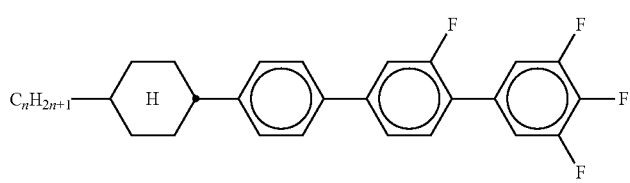
CPGU-n-F
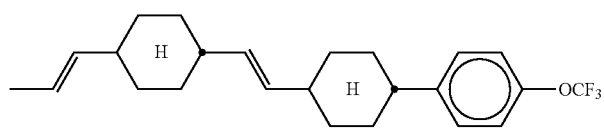
CVCP-1V-OT
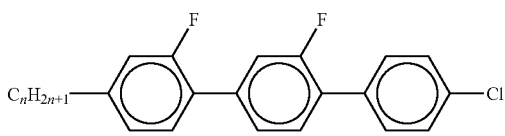
GGP-n-Cl
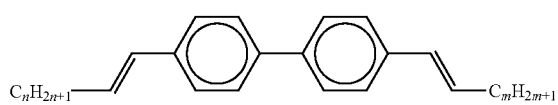
PP-nV-Vm
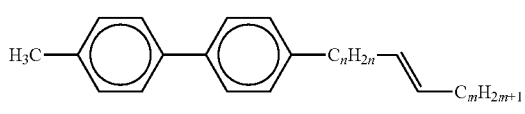
PP-1-nVm
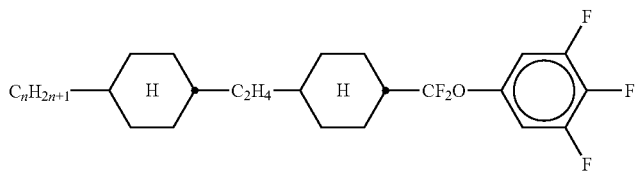
CWCQU-n-F
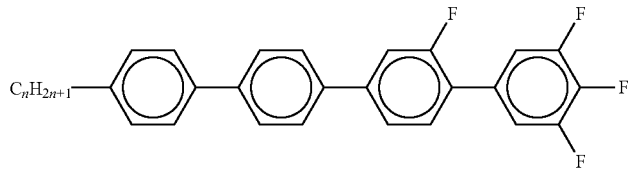
PPGU-n-F TABLE B-continued
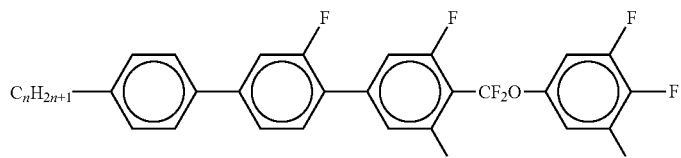
PGUQU-n-F
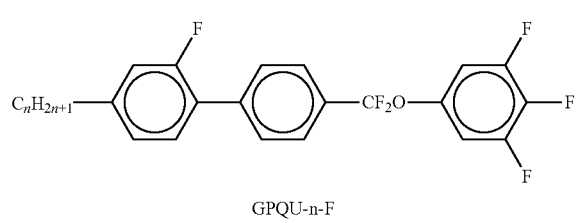
GPQU-n-F
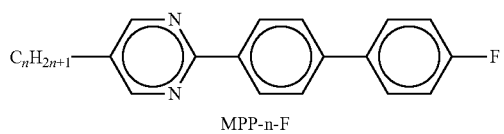
MPP-n-F
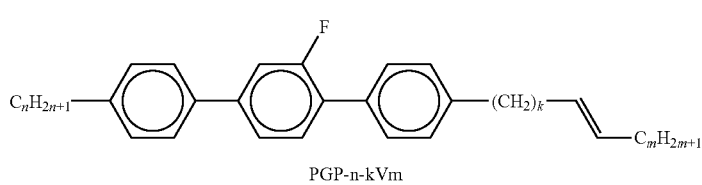
PGP-n-kVm
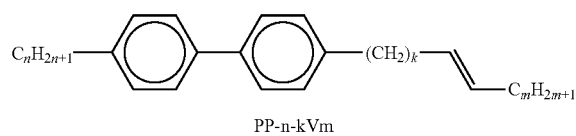
PP-n-kVm
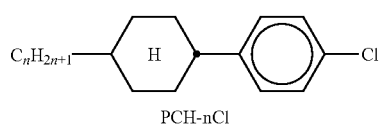
PCH-nCl
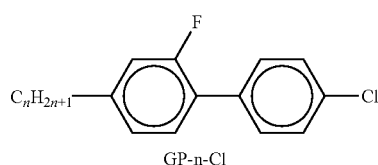
GP-n-Cl
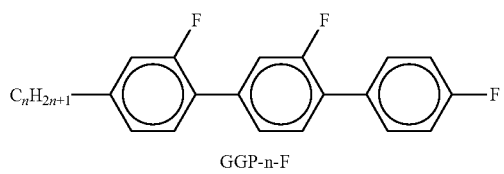
GGP-n-F
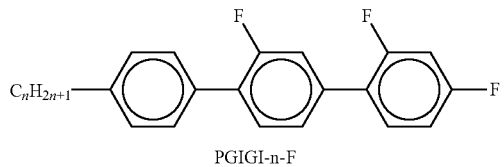
PGIGI-n-F Particular preference is given to liquid-crystalline mixtures which, besides the compounds of the formula I, comprise at least one, two, three, four or more compounds from Table A or B.

TABLE C

Table C indicates possible dopants which are generally added to the mixtures according to the invention. The mixtures preferably comprise 0-10% by weight, in particular 0.01-5% by weight and particularly preferably 0.01-3% by weight of dopants.

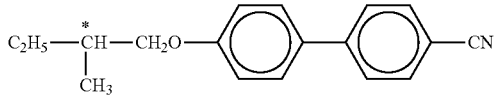

C 15

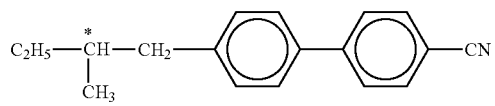

CB 15

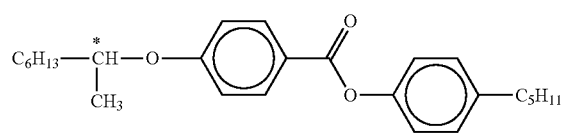

CM 21

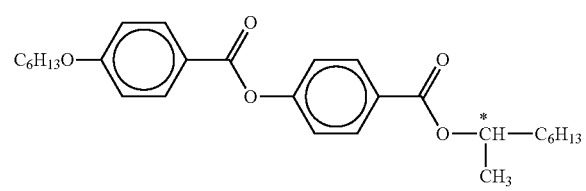

R/S-811

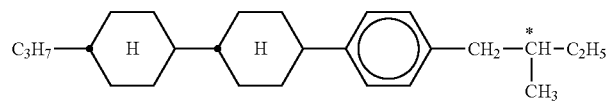

CM 44

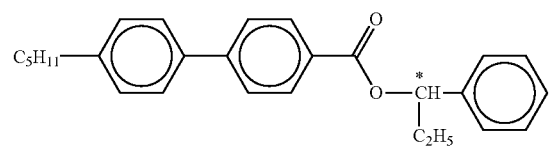

CM 45

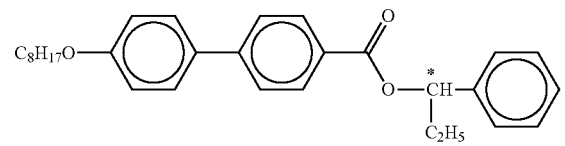

CM 47

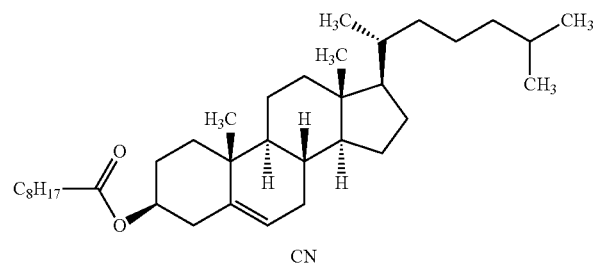

CN

TABLE C-continued

Table C indicates possible dopants which are generally added to the mixtures according to the invention. The mixtures preferably comprise 0-10% by weight, in particular 0.01-5% by weight and particularly preferably 0.01-3% by weight of dopants.

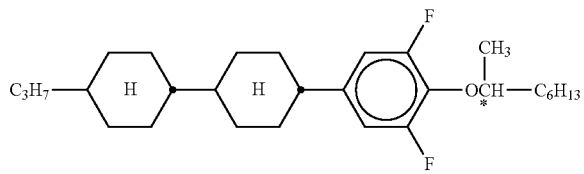

R/S-2011

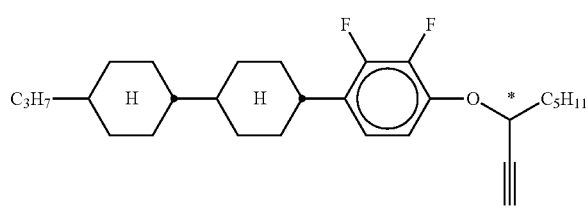

R/S-3011

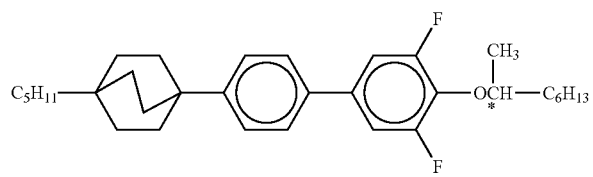

R/S-4011

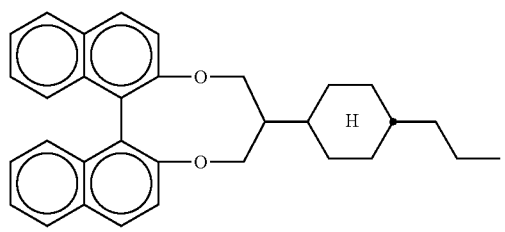

R/S-5011

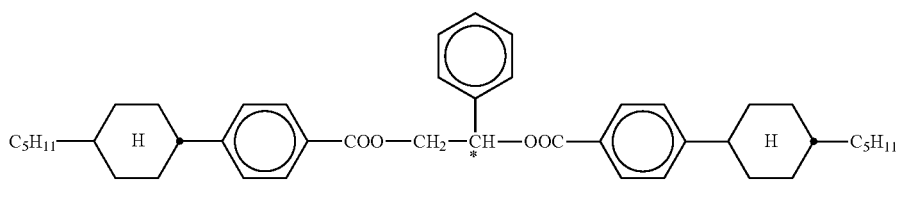

R/S-1011

TABLE D

Stabilisers which can be added, for example, to the mixtures according to the invention in amounts of 0-10% by weight are mentioned below.

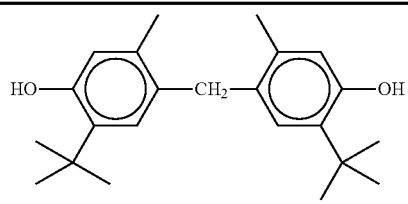

TABLE D-continued
Stabilisers which can be added, for example, to the mixtures according to the invention in amounts of 0-10% by weight are mentioned below.
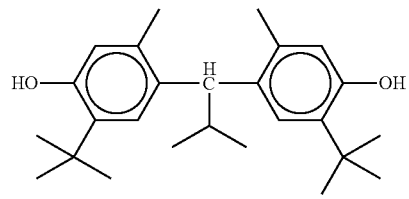
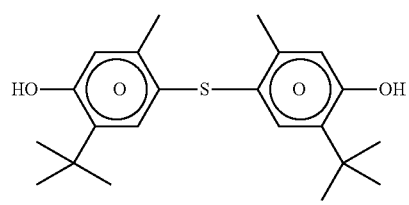
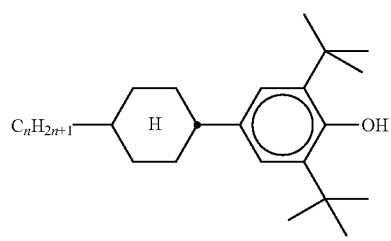
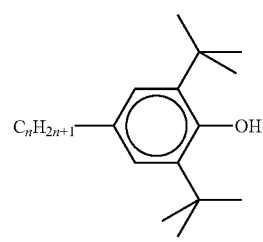
n = 1, 2, 3, 4, 5, 6, or 7
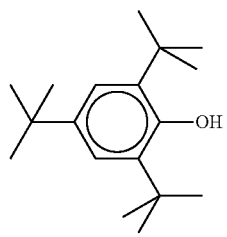
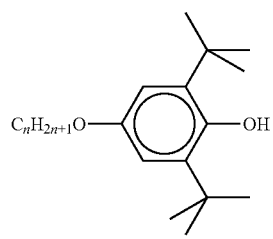

TABLE D-continued
Stabilisers which can be added, for example, to the mixtures according to the invention in amounts of 0-10% by weight are mentioned below.
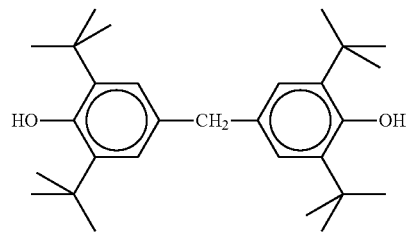
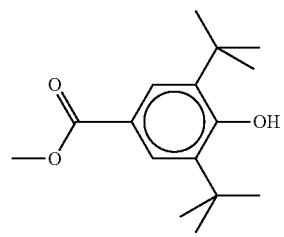
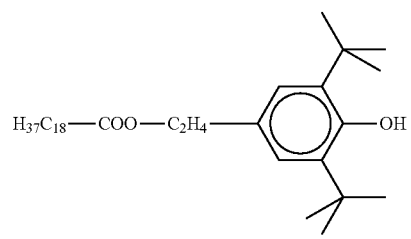
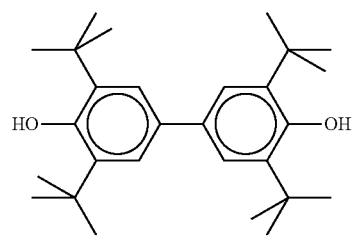
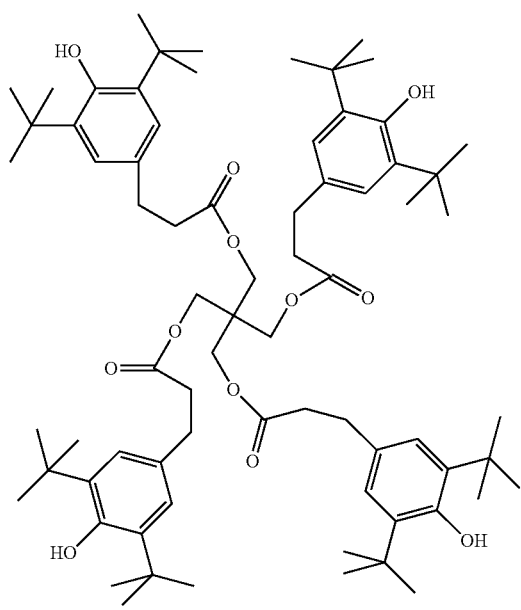 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
Stabilisers which can be added, for example, to the mixtures according to the invention in amounts of 0-10% by weight are mentioned below.
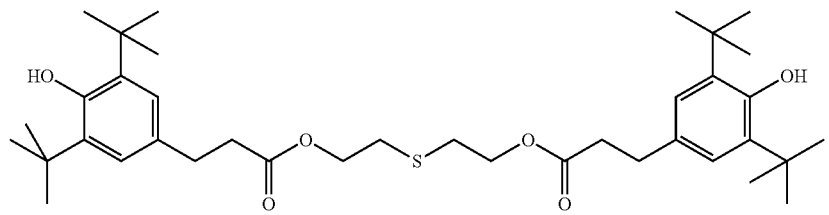 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
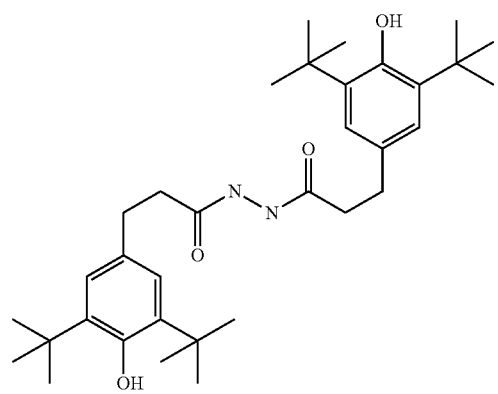 [SMILES: CC(C)(C)c1cc(CCC(=O)NNC(=O)CCc2cc(C(C)(C)C)c(O)c(C(C)(C)C)c2)cc(C(C)(C)C)c1O]
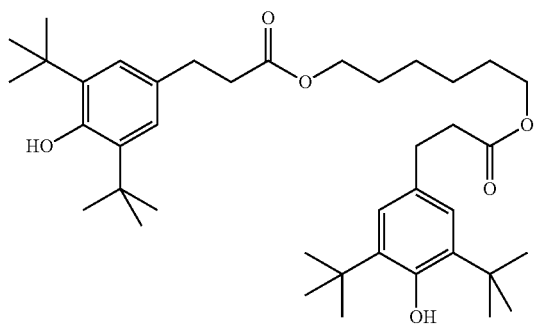 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
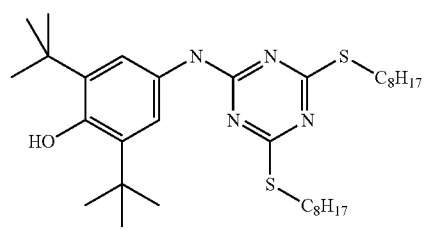

TABLE D-continued
Stabilisers which can be added, for example, to the mixtures according to the invention in amounts of 0-10% by weight are mentioned below.
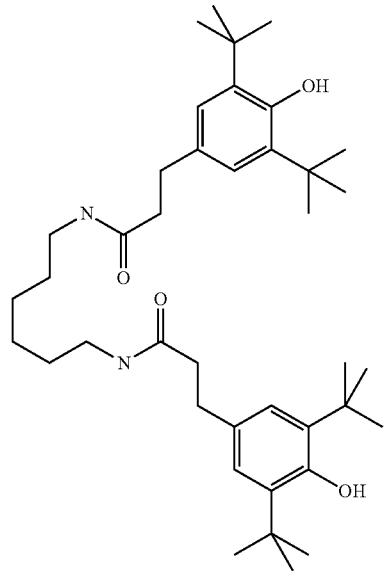 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
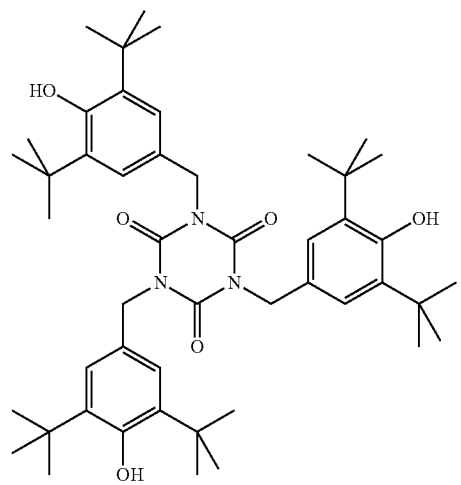 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
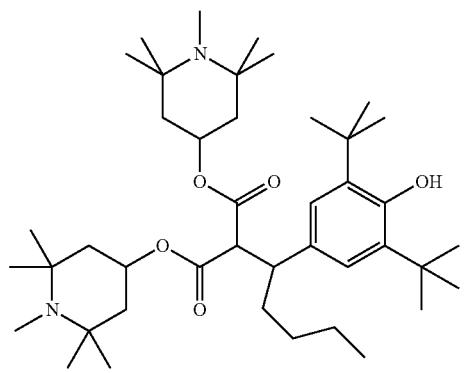 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
Stabilisers which can be added, for example, to the mixtures according to the invention in amounts of 0-10% by weight are mentioned below.
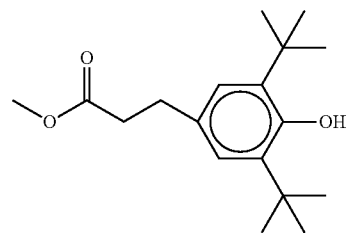
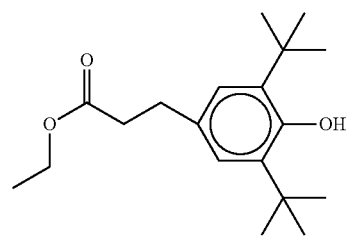
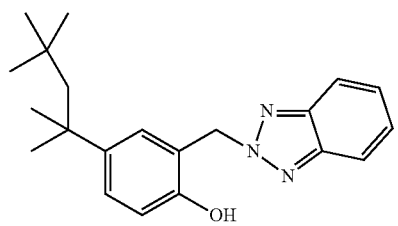 [SMILES: CC(C)(C)CC(C)(C)c1ccc(O)c(Cn2nc3ccccc3n2)c1]
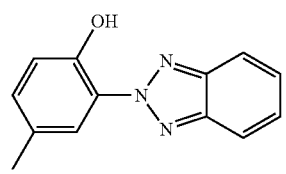 [SMILES: Cc1ccc(O)c(-n2nc3ccccc3n2)c1]
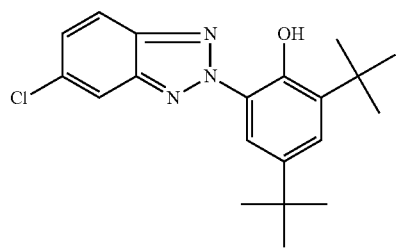 [SMILES: CC(C)(C)c1cc(-n2nc3ccc(Cl)cc3n2)c(O)c(C(C)(C)C)c1]
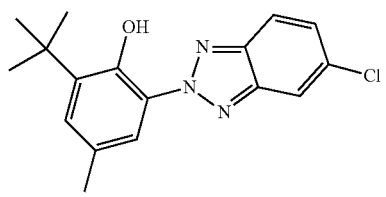 [SMILES: Cc1cc(-n2nc3ccc(Cl)cc3n2)c(O)c(C(C)(C)C)c1]

TABLE D-continued
Stabilisers which can be added, for example, to the mixtures according to the invention in amounts of 0-10% by weight are mentioned below.
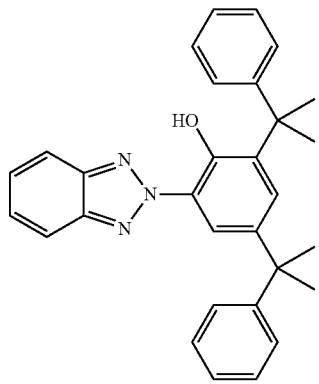 [SMILES: CC(C)(c1ccccc1)c1cc(-n2nc3ccccc3n2)c(O)c(C(C)(C)c2ccccc2)c1]
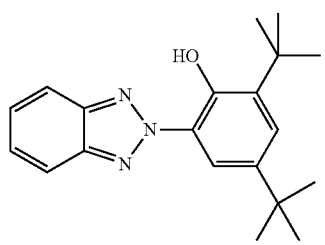 [SMILES: CC(C)(C)c1cc(-n2nc3ccccc3n2)c(O)c(C(C)(C)C)c1]
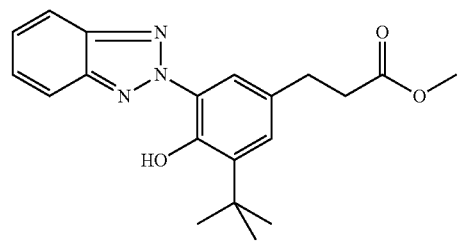 [SMILES: COC(=O)CCc1cc(-n2nc3ccccc3n2)c(O)c(C(C)(C)C)c1]
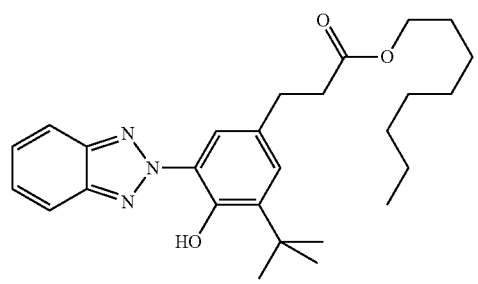 [SMILES: CCCCCCCCOC(=O)CCc1cc(-n2nc3ccccc3n2)c(O)c(C(C)(C)C)c1]

TABLE D-continued
Stabilisers which can be added, for example, to the mixtures according to the invention in amounts of 0-10% by weight are mentioned below.
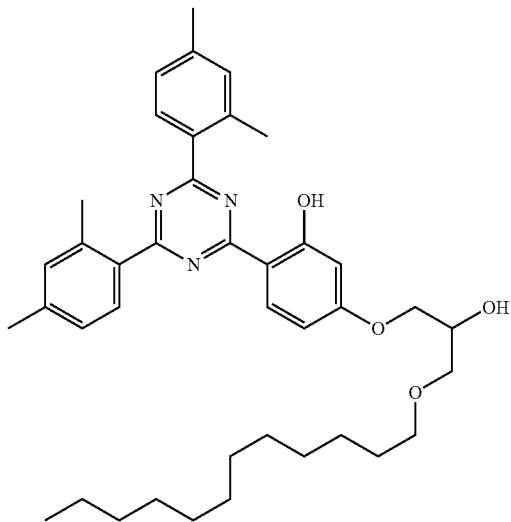 [SMILES: CCCCCCCCCCCCOCC(O)COc1ccc(-c2nc(-c3ccc(C)cc3C)nc(-c3ccc(C)cc3C)n2)c(O)c1]
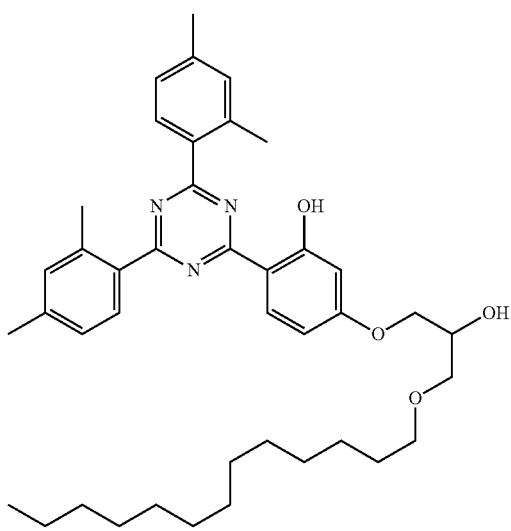 [SMILES: CCCCCCCCCCCCCOCC(O)COc1ccc(-c2nc(-c3ccc(C)cc3C)nc(-c3ccc(C)cc3C)n2)c(O)c1]
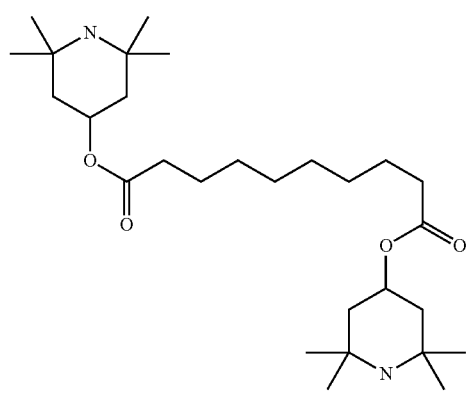

TABLE D-continued

Stabilisers which can be added, for example, to the mixtures according to the invention in amounts of 0-10% by weight are mentioned below.

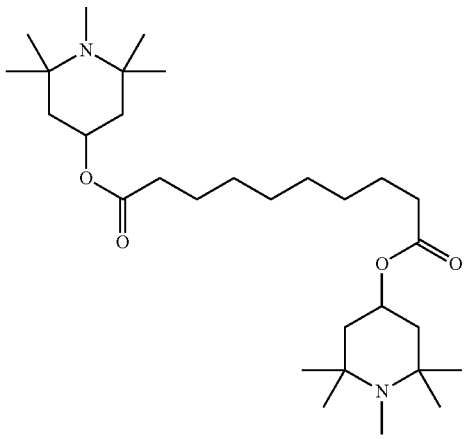

The following examples are intended to explain the invention without limiting it.

Above and below, percentages are percent by weight. All temperatures are indicated in degrees Celsius. m.p. denotes melting point, cl.p.=clearing point. Furthermore, C=crystalline state, S=smectic phase, N=nematic phase, Ch=cholesteric phase and I=isotropic phase. The data between these symbols represent the transition temperatures. Furthermore, the following abbreviations are used:

Δn optical anisotropy at 589 nm and 20° C.
$n_e$ extraordinary refractive index at 589 nm and 20° C.
Δε dielectric anisotropy at 20° C.
ε∥ dielectric constant parallel to the longitudinal molecular axes
$γ_1$ rotational viscosity [mPa·s], at 20° C. unless stated otherwise
$V_{10}$ threshold voltage [V]=characteristic voltage at a relative contrast of 10%
$V_{90}$ characteristic voltage [V] at a relative contrast of 90%
VHR voltage holding ratio [%]
SR specific resistance [Ω·cm] after X hours exposure to UV at room temperature
cl.p. clearing point The SR is measured as described in G. Weber et al., Liquid Crystals 5, 1381 (1989).

The VHR is measured as described by T. Jacob and U. Finkenzeller in "Merck Liquid Crystals—Physical Properties of Liquid Crystals", 1997.

USE EXAMPLES

Example M1

| CC-3-V1 | 10.0% | cl.p. [° C.]: | 80 |
| CC-4-V | 14.0% | Δn | 0.1030 |
| CCP—V-1 | 15.0% | Δε | +9.7 |
| PUQU-3-F | 18.0% | $γ_1$ | 89 |
| CCQU-3-F | 14.0% | | |
| CCQU-5-F | 4.0% | | |
| CCGU-3-F | 3.0% | | |
| PGP-2-3 | 2.0% | | |
| PGP-2-4 | 4.0% | | |
| CGU-3-F | 9.0% | | |
| CCP—3F•F•F | 7.0% | | |

To the above given mixture is added 0.2% by weight a polymer of the following structure:

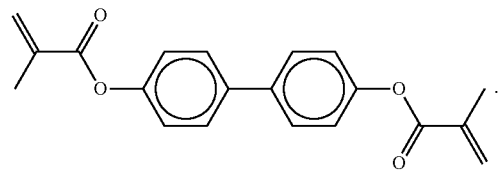

Comparative Example CE1

E1: Example M1: Mixture with 0.2% RM (processed)
E2: Example M1: Mixture without RM

| | E1 | E2 |
|---|---|---|
| $V_{10}$ [V] | 1.31 V | 1.40 V |
| $V_{50}$ [V] | 1.64 V | 1.70 V |
| $V_{90}$ [V] | 2.08 V | 2.14 V |
| $T_{on}$ ($T_{90}$-$T_{10}$) | 3.38 msec | 3.38 msec |

Example M2

| CC-3-V1 | 10.0% | cl.p. [° C.]: | 80 |
| CC-4-V | 14.0% | Δn | 0.1030 |
| CCP—V-1 | 15.0% | Δε | +9.7 |
| PUQU-3-F | 18.0% | $γ_1$ | 89 |
| CCQU-3-F | 14.0% | | |
| CCQU-5-F | 4.0% | | |
| CCGU-3-F | 3.0% | | |
| PGP-2-3 | 2.0% | | |
| PGP-2-4 | 4.0% | | |
| CGU-3-F | 9.0% | | |
| CCP—3F•F•F | 7.0% | | |

To the above given mixture is added 0.4% by weight a polymer of the following structure:

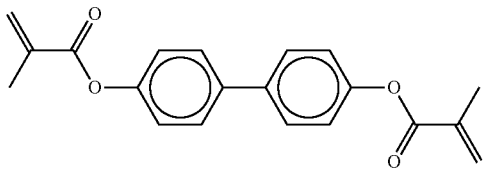

The electro-optical properties and the response times of this LC mixture are similar as given for Example M1.

Example M3

| CC-3-V1    | 10.0% | cl.p. [° C.]: | 80     |
|------------|-------|---------------|--------|
| CC-4-V     | 14.0% | Δn            | 0.1030 |
| CCP—V-1    | 15.0% | Δε            | +9.7   |
| PUQU-3-F   | 18.0% | γ₁            | 89     |
| CCQU-3-F   | 14.0% |               |        |
| CCQU-5-F   | 4.0%  |               |        |
| CCGU-3-F   | 3.0%  |               |        |
| PGP-2-3    | 2.0%  |               |        |
| PGP-2-4    | 4.0%  |               |        |
| CGU-3-F    | 9.0%  |               |        |
| CCP—3F•F•F | 7.0%  |               |        |

To the above given mixture is added 0.4% by weight a polymerisable compound of the following structure

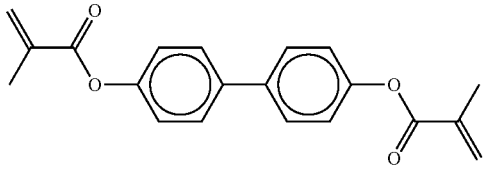

and 0.002% of an initiator, for example the photoinitiator Irgacure 651.

The electro-optical properties and the response times of this LC mixture are similar as given for Example M1.

Example M4

| CC-3-V1    | 10.0% | cl.p. [° C.]: | 80     |
|------------|-------|---------------|--------|
| CC-4-V     | 14.0% | Δn            | 0.1030 |
| CCP—V-1    | 15.0% | Δε            | +9.7   |
| PUQU-3-F   | 18.0% | γ₁            | 89     |
| CCQU-3-F   | 14.0% |               |        |
| CCQU-5-F   | 4.0%  |               |        |
| CCGU-3-F   | 3.0%  |               |        |
| PGP-2-3    | 2.0%  |               |        |
| PGP-2-4    | 4.0%  |               |        |
| CGU-3-F    | 9.0%  |               |        |
| CCP—3F•F•F | 7.0%  |               |        |

To the above given mixture is added 0.2% by weight a polymer of the following structure:

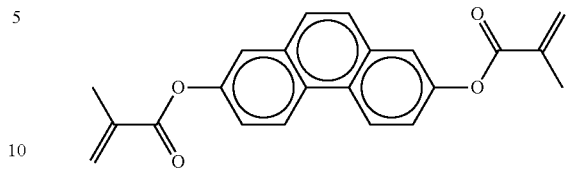

The electro-optical properties and the response times of this LC mixture are similar as given for Example M1.

The invention claimed is:
1. A liquid-crystalline medium, comprising
a polymerizable component (A) containing one more polymerizable compounds and
a liquid-crystalline component (B) containing one more compounds of formula I

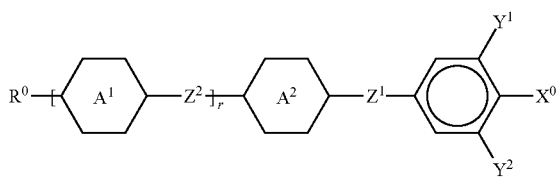

in which
$R^0$ is an alkyl or alkenyl radical having from 1 to 15 carbon atoms which is unsubstituted, monosubstituted by CN or $CF_3$, or at least monosubstituted by halogen, in which one or more $CH_2$ groups are optionally, independently of one another, replaced by —O—, —S—,

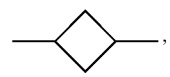

—CO—, —CO—O—, —O—CO—, —O—CO—O—, —CH=CH— or —C≡C— in such a way that O atoms are not linked directly to one another,

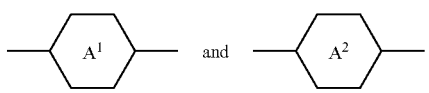

are each independently

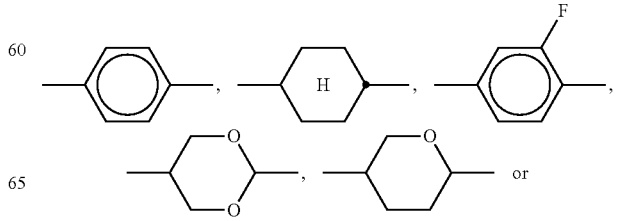

-continued

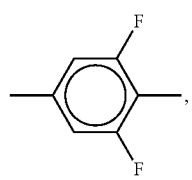

$Y^1$ and $Y^2$ are each, independently of one another, H or F, $Z^1$ is —CF$_2$O—, —OCF$_2$— or —COO—, $Z^2$ is —O—, —S—, —CO—, —COO—, —OCO—, —S—CO—, —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═CH—, —CF═CH—, —CH═CF—, —CF═CF—, —C≡C— or a single bond, $X^0$ is F, Cl, halogenated alkyl, halogenated alkenyl, halogenated alkoxy, or halogenated alkenyloxy having up to 6 carbon atoms, and r is 0, 1, 2 or 3, which liquid-crystalline medium has a positive dielectric anisotropy Δε.

2. A liquid-crystalline medium according to claim 1, wherein liquid-crystalline component (B) contains one or more compounds of formulae I1 to I5,

I1

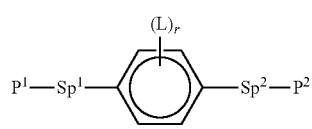

I2

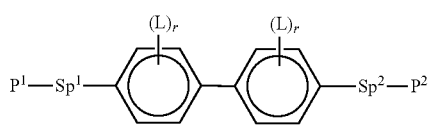

I3

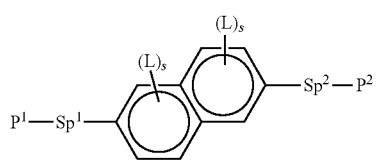

I4

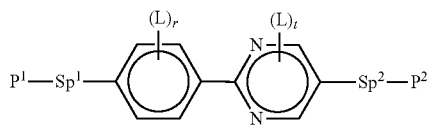

-continued

I5

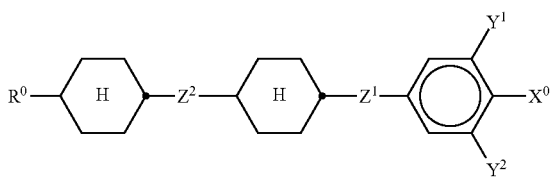

in which $X^0$, $Y^1$ and $Y^2$, $Z^1$, $Z^2$, $R^0$ and r have the meanings given for the compound of formula I.

3. A liquid-crystalline medium according to claim 1, wherein polymerizable component (A) contains at least one polymerizable compound of formulae I*1 to I*20,

I*1

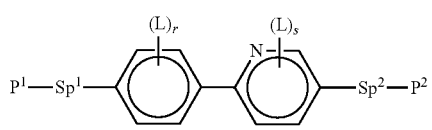

I*2

(structure)

I*3

(structure)

I*4

(structure)

I*5

(structure)

I*6

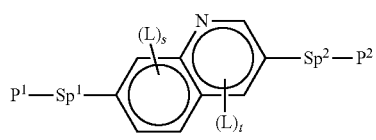

I*7

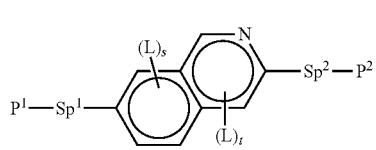

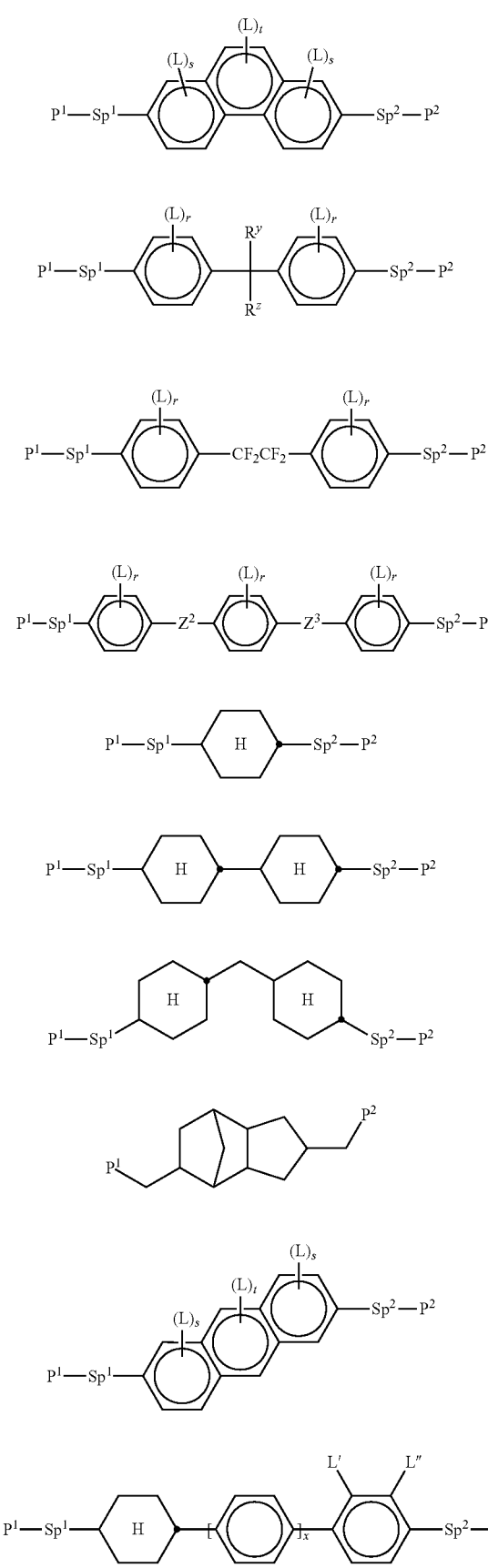

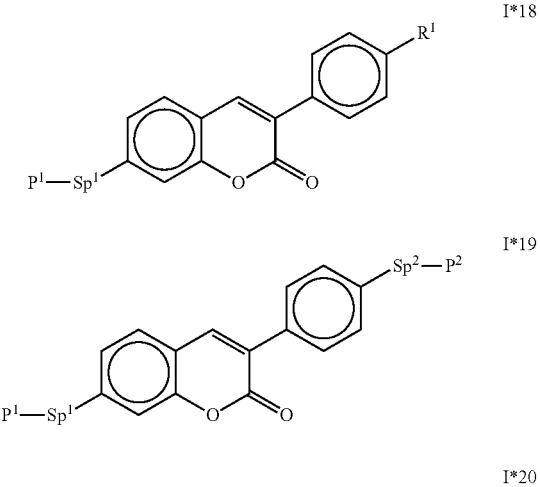

in which
R¹ is an alkyl or alkenyl radical having from 1 to 15 carbon atoms which is unsubstituted, monosubstituted by CN or CF₃, or at least monosubstituted by halogen, in which one or more CH₂ groups are optionally, independently of one another, replaced by —O—, —S—, —CO—, —CO—O—, —O—CO—, —O—CO—O—, —CH=CH— or —C≡C— in such a way that O atoms are not linked directly to one another, P¹ and P² have one of the meanings indicated for P,
P denotes a polymerizable group,
Sp¹ and Sp² have one of the meanings indicated for Sp or denote a single bond,
Sp denotes a spacer group,
Z² and Z³ each, independently of one another, denote —COO— or —OCO—,
L denotes P—Sp-, F, Cl, Br, I, —CN, —NO₂, —NCO, —NCS, —OCN, —SCN, —C(=O)N(Rˣ)₂, —C(=O)Y¹, —C(=O)Rˣ, —N(Rˣ)₂, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which one or more H atoms are optionally replaced by F, Cl or P—Sp-,
L' and L" each, independently of one another, denote H, F or Cl,
r denotes 0, 1, 2, 3 or 4,
s denotes 0, 1, 2 or 3,
t denotes 0, 1 or 2,
x denotes 0 or 1, and
Rˣ denotes H or CH₃.

4. A liquid-crystalline medium according to claim 3, wherein polymerizable component (A) contains at least one polymerizable compound of formulae RM1 to RM12

83 84
RM-1
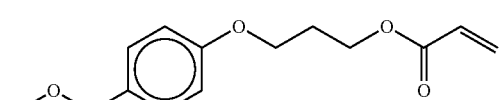
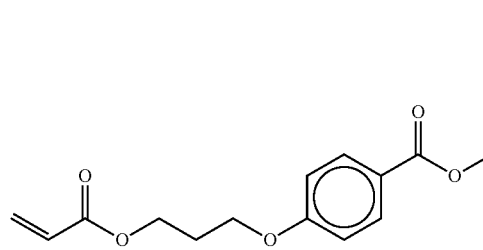
RM-2 RM-3
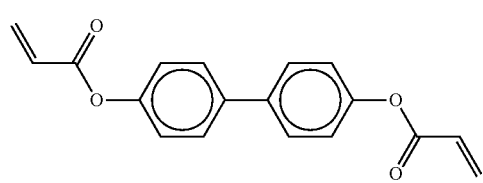 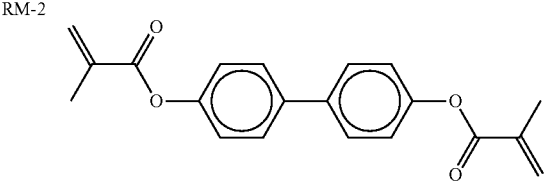
RM-4 RM-5
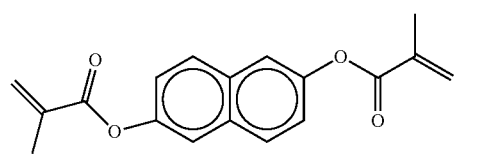 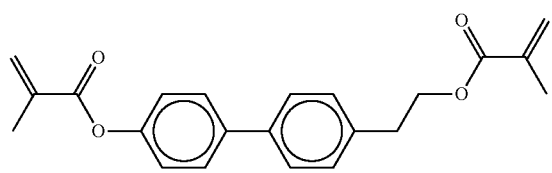
RM-6 RM-7
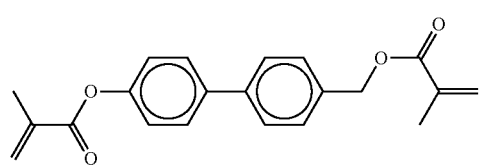 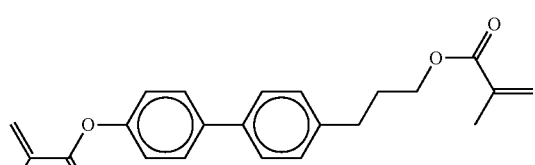
RM-8 RM-9
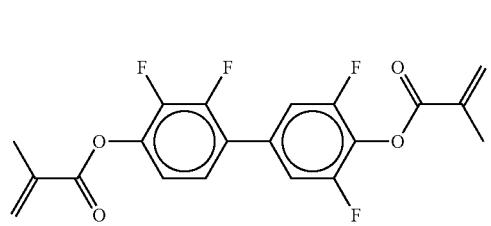 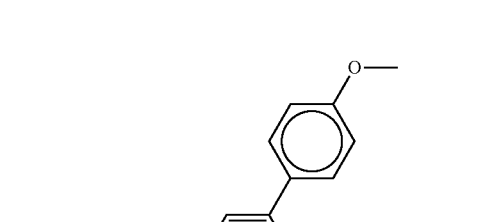
RM-10 RM-11
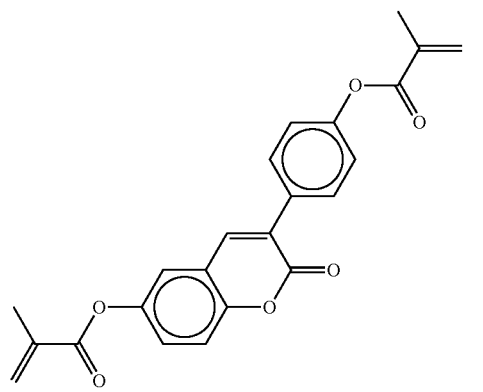 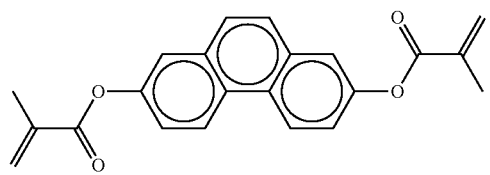

RM-12

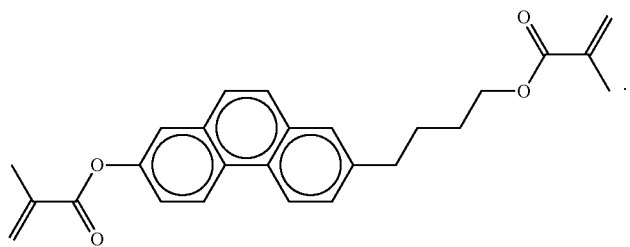

5. A liquid-crystalline medium according to claim 1, wherein liquid-crystalline component (B) additionally contains one or more compounds of formulae III to VIII,

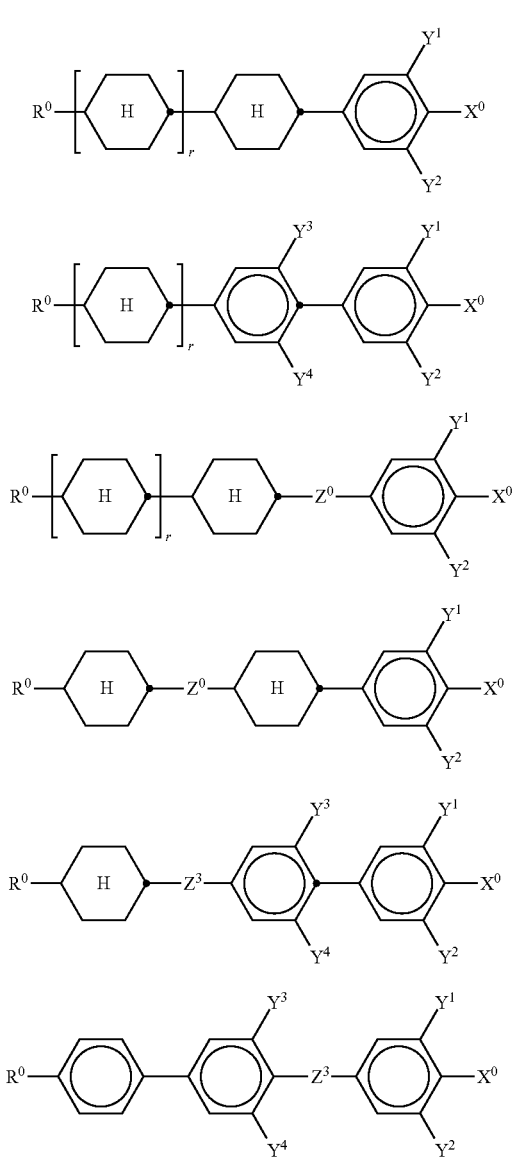

in which

R is an alkyl or alkenyl radical having from 1 to 15 carbon atoms which is unsubstituted, monosubstituted by CN or CF$_3$, or at least monosubstituted by halogen, in which one or more CH$_2$ groups are optionally, independently of one another, replaced by —O—, —S—,

—CO—, —CO—O—, —O—CO—, —O—CO—, —CH=CH— or —C≡C— in such a way that O atoms are not linked directly to one another, X$^0$ is F, Cl, halogenated alkyl, halogenated alkenyl, halogenated alkoxy, or halogenated alkenyloxy having up to 6 carbon atoms, and r is 0, 1, 2 or 3, Z$^0$ is —C$_2$F$_4$—, —CF=CF, —CH=CF, —CF=CH—, —C$_2$H$_4$—, —(CH$_2$)$_4$—, —OCH$_2$— or —CH$_2$O—, Z$^3$ is —C$_2$F$_4$—, —CF=CF—, —CH=CF—, —CF=CH—, —C$_2$H$_4$—, —(CH$_2$)$_4$—, —OCH$_2$— or —CH$_2$O—, and Y$^{1-4}$ are each independently H or F.

6. A liquid-crystalline medium according to claim 1, wherein the proportion of the compounds of formula I in the medium as a whole is from 2 to 30% by weight based on the total medium.

7. A liquid-crystalline medium according to claim 1, which contains <5% by weight of a polymerizable compound based on the liquid crystalline medium.

8. A method of achieving an electro-optical effect comprising applying an electric signal to a liquid crystalline medium of claim 1.

9. An electro-optical liquid-crystal display containing a liquid-crystalline medium according to claim 1.

10. An electro-optical liquid-crystal display according to claim 9, which is a TN, TN-TFT, FFS or IPS display.

11. A liquid-crystalline medium according to claim 1, which has a dielectric anisotropy Δ∈ of ≥5 at 20° C.

12. A liquid-crystalline medium according to claim 1, which has a dielectric anisotropy Δ∈ of ≥8 at 20° C.

13. A liquid-crystalline medium according to claim 1, which has a dielectric anisotropy Δ∈ of 9.7 at 20°C.

14. A liquid-crystalline medium according to claim 1, which has a dielectric anisotropy Δ∈ of ≥10 at 2020 C.

15. A liquid-crystalline medium, comprising a polymerizable component (A) containing one more polymerizable compounds and a liquid-crystalline component (B) containing one more compounds of formulae I3 to I5,

I3

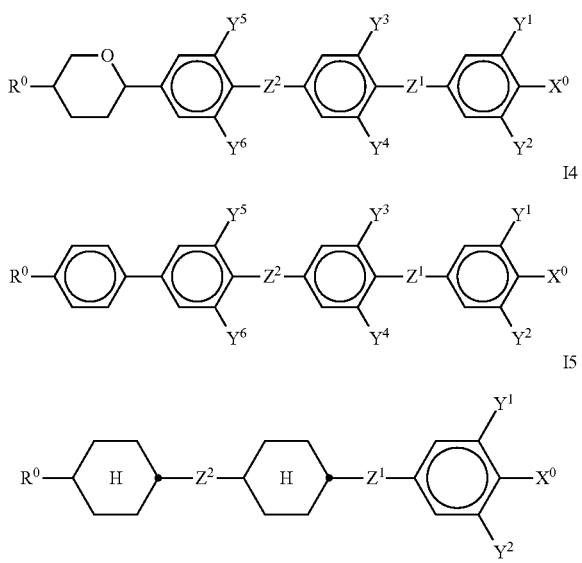

I4

I5 in which
R is an alkyl or alkenyl radical having from 1 to 15 carbon atoms which is unsubstituted, monosubstituted by CN or CF$_3$, or at least monosubstituted by halogen, in which one or more CH$_2$ groups are optionally, independently of one another, replaced by —O—, —S—,

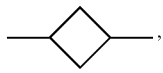

—CO—, —CO—O—, —O—CO—, —O—CO—O—, —CH═CH— or —C≡C— in such a way that O atoms are not linked directly to one another,

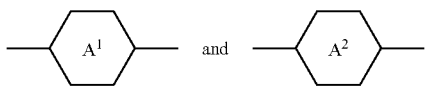

are each independently

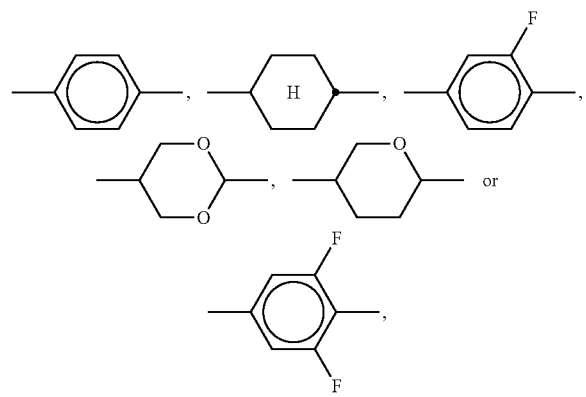

Y$^1$ and Y$^2$ are each, independently of one another, H or F,
Z$^1$ is —CF$_2$O—, —OCF$_2$— or —COO—,
Z$^2$ is —O—, —S—, —CO—, —COO—, —OCO—, —S—CO—, —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═CH—, —CF═CH—, —CH═CF—, —CF═CF—, —C≡C— or a single bond, X$^0$ is F, Cl, halogenated alkyl, halogenated alkenyl, halogenated alkoxy, or halogenated alkenyloxy having up to 6 carbon atoms, and
r is 0, 1, 2 or 3,
which liquid-crystalline medium has a positive dielectric anisotropy Δ∈.

16. A liquid-crystalline medium according to claim 15, which has a dielectric anisotropy Δ∈ of ≥5 at 20°C.

17. A liquid-crystalline medium according to claim 15, which has a dielectric anisotropy Δ∈ of ≥8 at 20°C.

18. A liquid-crystalline medium according to claim 1, wherein in the compound of formula I
X$^0$ is F, Cl, halogenated alkyl, halogenated alkenyl or halogenated alkoxy having up to 6 carbon atoms.

19. A liquid-crystalline medium according to claim 1, wherein in the one more compounds of formulae 13 to 15
X$^0$ is F, Cl, halogenated alkyl, halogenated alkenyl or halogenated alkoxy having up to 6 carbon atoms.

20. An electro-optical liquid-crystal display, which is a TN, TN-TFT, FFS or IPS display, and which contains a liquid-crystalline medium, comprising
a polymerizable component (A) containing one more polymerizable compounds and
a liquid-crystalline component (B) containing one more compounds of formula I, wherein the proportion of the compounds of formula I in the medium as a whole is from 2 to 30% by weight based on the total medium,

I

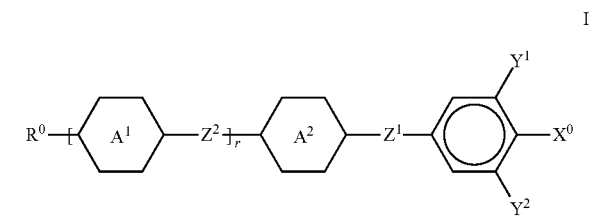

in which
R$^0$ is an alkyl or alkenyl radical having from 1 to 15 carbon atoms which is unsubstituted, monosubstituted by CN or CF$_3$, or at least monosubstituted by halogen, in which one or more CH$_2$ groups are optionally, independently of one another, replaced by —O—, —S—,

—CO—, —CO—O—, —O—CO—, —O—CO—O—, —CH═CH— or —C≡C— in such a way that O atoms are not linked directly to one another,

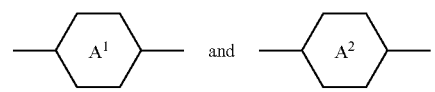

are each independently

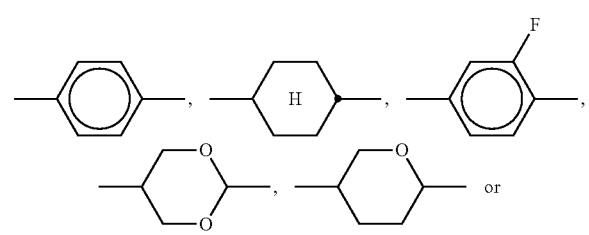

-continued

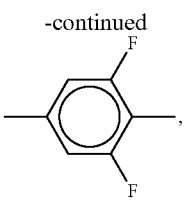, 5

Y$^1$ and Y$^2$ are each, independently of one another, H or F,

Z$^1$ is —CF$_2$O—, —OCF$_2$— or —COO—,

Z$^2$ is —O—, —S—, —CO—, —COO—, —OCO—, —S—CO—, —CO—S—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C— or a single bond, X$^0$ is F, Cl, halogenated alkyl, halogenated alkenyl, halogenated alkoxy, or halogenated alkenyloxy having up to 6 carbon atoms, and r is 0, 1, 2 or 3, which liquid-crystalline medium has a positive dielectric anisotropy Δ∈.

* * * * *

UNITED STATES PATENT AND TRADEMARK OFFICE
CERTIFICATE OF CORRECTION

PATENT NO. : 8,551,358 B2  Page 1 of 1
APPLICATION NO. : 13/000747
DATED : October 8, 2013
INVENTOR(S) : Seung-Eun Lee et al.

It is certified that error appears in the above-identified patent and that said Letters Patent is hereby corrected as shown below:

IN THE CLAIMS:

Column 85, line 66 (Claim 5), reads: -- Ris an alkyl or alkenyl radical having from 1 to 5 carbon --.
Should read as follows: -- $R^0$ is an alkyl or alkenyl radical having from 1 to 5 carbon --.

Column 86, line 24 (Claim 5), reads: -- -CO-, -CO-O-, -O-CO-, -O-CO-, --.
Should read as follows: -- -CO-, -CO-O-, -O-CO-, -O-CO-O-, --.

Column 86, line 62 (Claim 14), reads: -- which has a dielectric anisotropy ΔE of ≥ 10 at 2020 C. --.
Should read as follows: -- which has a dielectric anisotropy ΔE of ≥ 10 at 20° C. --.

Column 86, line 64 (Claim 15), reads: -- a polymerizable component (A) containing one more poly- --.
Should read as follows: -- a polymerizable component (A) containing one or more poly- --.

Column 86, line 66 (Claim 15), reads: -- a liquid-crystalline component (B) containing one more --.
Should read as follows: -- a liquid-crystalline component (B) containing one or more --.

Column 87, line 26 (Claim 15), reads: -- Ris an alkyl or alkenyl radical having from 1 to 5 carbon --.
Should read as follows: -- $R^0$ is an alkyl or alkenyl radical having from 1 to 5 carbon --.

Signed and Sealed this
Twenty-fifth Day of March, 2014

Michelle K. Lee
*Deputy Director of the United States Patent and Trademark Office*